(12) United States Patent
Remis et al.

(10) Patent No.: US 11,386,157 B2
(45) Date of Patent: Jul. 12, 2022

(54) METHODS AND APPARATUS TO FACILITATE GENERATION OF DATABASE QUERIES

(71) Applicant: Intel Corporation, Santa Clara, CA (US)

(72) Inventors: Luis Carlos Maria Remis, Hillsboro, OR (US); Ignacio Javier Alvarez, Portland, OR (US); Li Chen, Hillsboro, OR (US); Javier Felip Leon, Hillsboro, OR (US); David Israel Gonzalez Aguirre, Hillsboro, OR (US); Justin Gottschlich, Santa Clara, CA (US); Javier Sebastian Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 16/457,203

(22) Filed: Jun. 28, 2019

(65) Prior Publication Data

US 2019/0317965 A1 Oct. 17, 2019

(51) Int. Cl.
*G06F 16/9032* (2019.01)
*G06F 16/2457* (2019.01)
*G06F 16/9038* (2019.01)

(52) U.S. Cl.
CPC .. *G06F 16/90328* (2019.01); *G06F 16/24578* (2019.01); *G06F 16/9038* (2019.01)

(58) Field of Classification Search
CPC ......... G06F 16/90328; G06F 16/24578; G06F 16/9038; G06F 16/367; G06F 16/3322
See application file for complete search history.

(56) References Cited

U.S. PATENT DOCUMENTS

| 7,827,125 B1* | 11/2010 | Rennison | G06F 16/3332 |
| | | | 706/14 |
| 2007/0156677 A1* | 7/2007 | Szabo | G06F 16/2457 |
| 2008/0114750 A1* | 5/2008 | Saxena | G06F 16/3346 |

(Continued)

OTHER PUBLICATIONS

Remis, et al. "VDMS: Efficient Big-Visual-Data Access for Machine Learning Workloads." Systems for Machine Learning Workshop at NIPS 2018, 7 pages.

(Continued)

*Primary Examiner* — Ashish Thomas
*Assistant Examiner* — Yohanes D Kelemework
(74) *Attorney, Agent, or Firm* — Hanley, Flight & Zimmerman, LLC

(57) ABSTRACT

Methods and apparatus to facilitate generation of database queries are disclosed. An example apparatus includes a generator to generate a global importance tensor. The global importance tensor based on a knowledge graph representative of information stored in a database. The knowledge graph includes objects and connections between the objects. The global importance tensor includes importance values for different types of the connections between the objects. The example apparatus further includes an importance adaptation analyzer to generate a session importance tensor based on the global importance tensor and a user query, and a user interface to provide a suggested query to a user based on the session importance tensor.

33 Claims, 14 Drawing Sheets

(56) References Cited

U.S. PATENT DOCUMENTS

| | | | | |
|---|---|---|---|---|
| 2012/0278321 | A1* | 11/2012 | Traub | G06F 16/3331 |
| | | | | 707/736 |
| 2015/0169758 | A1* | 6/2015 | Assom | G06F 16/36 |
| | | | | 707/603 |
| 2016/0224637 | A1* | 8/2016 | Sukumar | G06F 16/951 |
| 2018/0349477 | A1* | 12/2018 | Jaech | G06F 16/9535 |
| 2019/0044959 | A1 | 2/2019 | Chen | |
| 2019/0311301 | A1* | 10/2019 | Pyati | G06F 16/901 |

OTHER PUBLICATIONS

Stefani et al. "Implementing Triple-Stores using NoSQL Databases", 3rd International Conference on Recent Trends and Applications in Computer Science and Information Technology (2018), 7 pages.

Zloof, "Query by Example: a data base language." in IBM Systems Journal 16(4), pp. 324-343 (1977), 20 pages.

Jayaram et al. "Querying Knowledge Graphs by Example Entity Tuples," in IEEE Transactions on Knowledge and Data Engineering, vol. 27, No. 10, pp. 2797-2811 (2013). 17 pages.

Jermaine et al. "Finding the most interesting correlations in a database: how hard can it be?" Information Systems 30, pp. 21-46 (Mar. 2005), 26 pages.

Billerbeck et al. "Query Expansion using Associated Queries." in Proceedings of 12th International Conf. on Information and Knowledge Management, pp. 2-9 (2003), 8 pages.

Moreau et al. "Fuzzy Query by Example." SAC 2018—The 33rd ACM/SIGAPP Symposium on Applied Computing (2018), 9 pages.

W3C, "SPARQL Query Language for RDF" available at https://www.w3.org/TR/rdf-sparql-query/, accessed Jun. 10, 2019, 72 pages.

Apache Tinkertop "The Gremlin Graph Traversal Machine and Language," available at https://tinkerpop.apache.org/gremlin.html, accessed on Jun. 10, 2019, 5 pages.

Gupta-Cledat et al. "Addressing the dark side of vision research: storage." In 9th {USENIX} Workshop on Hot Topics in Storage and File Systems (2017), 6 pages.

Lyzinski et al. "Seeded Graph Matching for Correlated Erdös-Rényi Graphs." Journal of Machine Learning Research 15.1 (2014), pp. 3513-3540, 28 pages.

Lysinski et al. (2015). "Spectral Clustering for Divide-and-Conquer Graph Matching," Parallel Computing, vol. 47, pp. 70-87 (2014), 20 pages.

Belkin et al. "Laplacian Eigenmaps and Epectral Techniques for Embedding and Clustering," in Advances in Neural Information Processing Systems, pp. 585-591 (2002), 7 pages.

Kipf et al. (2016). "Semi-Supervised Classification with Graph Convolutional Networks." in International Conference on Learning Representations (ICLR) 2017, 14 pages.

Hartigan et al. "Algorithm AS 136: A k-means clustering algorithm." Journal of the Royal Statistical Society. Series C (Applied Statistics), 28(1), pp. 100-108, (1979) 10 pages.

Bailey et al. "Fitting a mixture model by expectation maximization to discover motifs in bipolymers." in ISMB-94 Proceedings, pp. 28-39 (1994), 9 pages.

Moreau et al. "A Fuzzy Approach to the Characterization of Database Query Answers," in Proceedings of Information Processing and Management of Uncertainty in Knowledge-Based System (IPMU) 2016, 12 Pages.

Devarakonda et al. "Social Media Based NPL System to Find and Retrieve ARM Data: Concept paper," in 2017 IEEE International Conference on Big Data, 2017, pp. 4736-4737), 2 pages.

* cited by examiner

METHODS AND APPARATUS TO FACILITATE GENERATION OF DATABASE QUERIES

FIELD OF THE DISCLOSURE

This disclosure relates generally to knowledge-database systems, and, more particularly, to methods and apparatus to facilitate generation of database queries.

BACKGROUND

A traditional approach to storing data involves the use of a relational database, which is based on the data being stored in tables. With recent developments in technology, new ways to store data have been developed such as a graph database based on the data being stored as nodes and associated connections. Another approach involves storing data in a triplestore database, which is based on the data being stored in triples that include a subject-predicate-object combination of data.

BRIEF DESCRIPTION OF THE DRAWINGS

In general, the same reference numbers will be used throughout the drawing(s) and accompanying written description to refer to the same or like parts.

Figure 1:
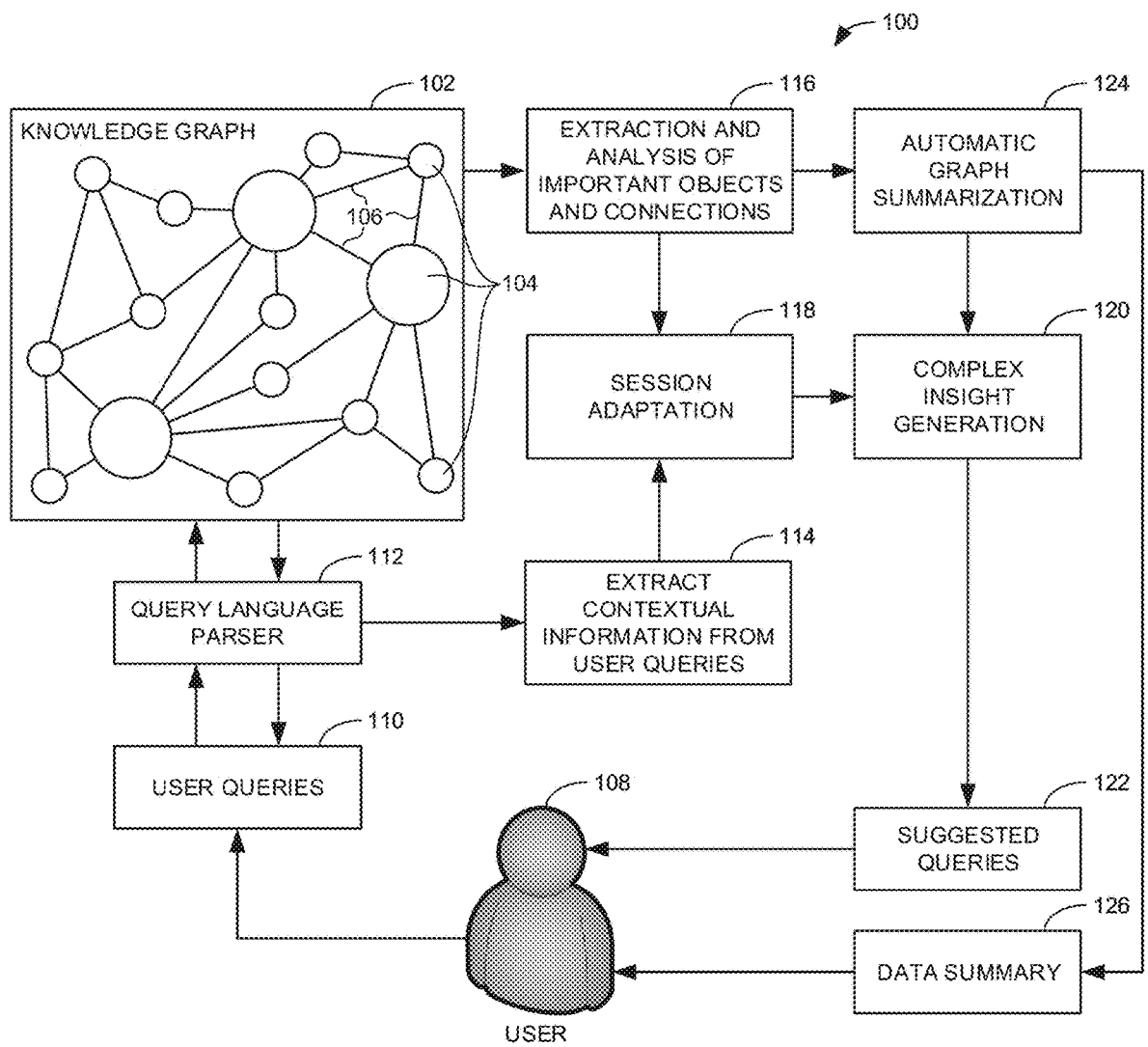
FIG. 1 is a block diagram illustrating an example data process flow associated with an example database query system implemented in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Different approaches to storing data (e.g., relational databases, graph databases, triplestore databases, etc.) offer different advantages and/or different drawbacks. In many situations, users are limited to choosing a particular type of database to store data. As a result, users are often limited in the ways in which they may access or retrieve information of interest through one or more database queries. Examples disclosed herein assist users in generating meaningful queries to access and/or uncover useful insights from a database regardless of the type of database used. That is, in accordance with teachings disclosed herein, users may structure a database in whatever manner is best suited for the data being stored and/or the particular application for the database while still having the flexibility to query the database in an efficient manner to obtain valuable insights from the data.

While a query system that is agnostic to the structure of the underlying database is an improvement to many existing systems, the value of the insights obtained from any particular query is dependent on the query itself. As technology has advanced to enable the capture and/or collection of massive amounts of data that are interrelated in complex manners, it has become difficult for humans to full appreciate what knowledge and/or information is stored in a database sufficiently to craft suitable queries to retrieve or uncover such information. That is, in some instances, a user may not even know what to look for when querying a database because of the amount, complexity, and/or composition of data stored in a database.

As a specific example, massive amounts of visual data are being continuously generated by ubiquities camera sensor networks (e.g., surveillance systems). These raw data streams are increasingly being interpreted and enhanced with new forms of meaningful metadata based on advances in machine learning. Metadata extracted from such visual data is often stored in knowledge graphs using relational databases, graph databases, or triplestore databases. Even if developers and data scientists understand the contextual origin of the raw data, labels, and metadata generated by machine learning (in terms of classification and semantic segmentation), the size, complexity, and/or nature of the data make it virtually impossible for a such people (or anyone) to fully understand the complete multifaceted structure of the database. As such, while users may be able to craft some queries that provide meaningful insights into the nature of the data, there are likely to be insights that could be gleaned from the data that remain hidden because of the users ability in to make the necessary connections to formulate a query that would uncover such insights.

Examples disclosed herein overcome the limitations of human-understanding of the knowledge contained in a database by automatically generating suggested queries for a user based on an analysis of the data stored in a knowledge graph and based on queries users have already performed. That is, in some examples, a query by a user provides an initial indication of the types of information and/or insights the user is interested in, which may then be used to identify other potentially relevant avenues of information about which the user may be interested in querying the database. As the user either accepts or rejects suggested queries, examples disclosed herein improve and/or adapt over time based on user interactions to concentrate subsequent suggested queries on information of interest to the users while iteratively adapting to extract various nuances and/or insights in the data that the users may not have discovered by themselves. Examples disclosed herein are able to provide meaningful suggestions in response to user interactions based on an independent analysis of the knowledge graph representative of the database information. Such analysis enables the extraction of data distribution statistics for the data in the knowledge graph, which is used to calculate importance values for particular objects within the graph and their associated connections. In some examples, the importance values associated with objects and connections within the knowledge graph are updated based on user queries of the database thereby enabling the system to evolve over time based on the needs and/or interests of users interacting with the system.

FIG. 1 is a block diagram illustrating an example data process flow associated with an example database query system 100 implemented in accordance with teachings disclosed herein. As shown in the illustrated example, the database query system 100 is associated with an example knowledge graph 102 representative of information stored in a database. As used herein, a knowledge graph is a representation of different entities within a particular domain and the interrelationships of such entities in the form of a network or graph. Although illustrated as a graph of nodes and connections in FIG. 1, knowledge graphs may be used to model or represent data and/or relationships among data in any suitable format. Thus, the example knowledge graph 102 of FIG. 1 may represent the information in a relational database, a graph database, a triplestore database, and/or any other suitable type of database. In other words, the depiction of FIG. 1 is not intended to limit the knowledge graph to an underlying graph database.

Individual entities within the database represented by the knowledge graph 102 are represented within the graph of FIG. 1 by individual nodes, vertices, or objects 104. The interrelationships between the entities in the knowledge graph 102 are represented by edges or connections 106 between different ones of the objects 104. In some examples, the objects 104 and/or the connections 106 may be grouped or classified by type. That is, multiple objects 104 may correspond to the same object type and multiple connections may correspond to the same connection type.

Figure 2:
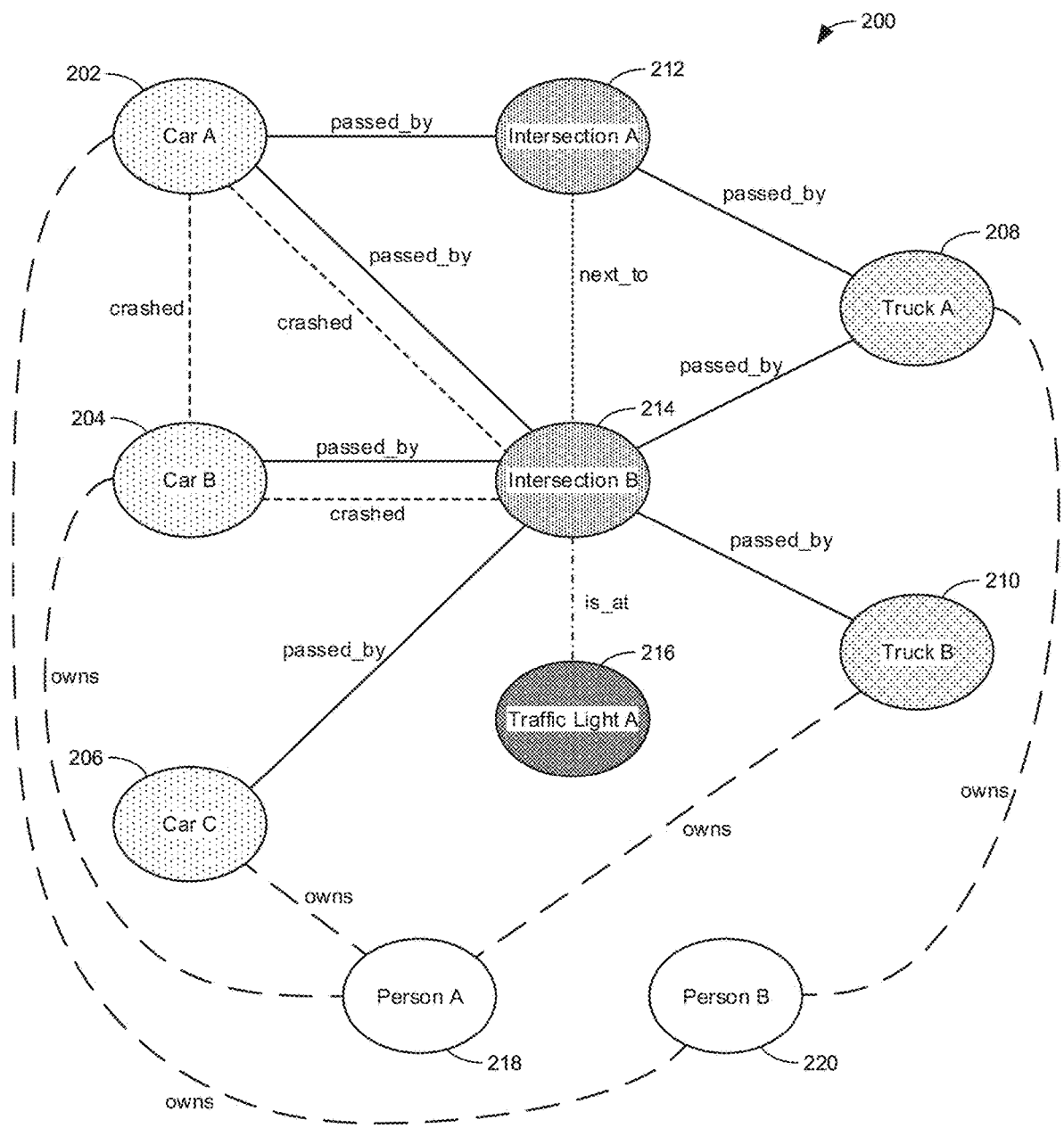
FIG. 2 is an example knowledge graph that may be used by the example database query system of FIG. 1.

A concrete example knowledge graph 200 is shown in FIG. 2. The example knowledge graph 200 may be generated by machine learning analysis of video streams of video surveillance systems viewing outside traffic. In the illustrated example there are 10 different objects of six different types. The different types of objects are identified in the illustrated example of FIG. 2 by different shading for purposes of clarity. In particular, there are three objects 202, 204, 206 corresponding to the object type "car;" two objects 208, 210 corresponding to the object type "truck;" two objects 212, 214 corresponding to the object type "intersection;" one object 216 corresponding to the object type "traffic light;" and two objects 218, 220 corresponding to the object type "person." Further, as shown in the illustrated example, relationships between the objects 202-220 are represented by a plurality of connections of five different types. The type of connection is represented by different styles of lines in the illustrated example of FIG. 2 for purposes of clarity. Specifically, as shown by the labels in the illustrated example, the connection types include "crashed," "is_at," "next_to," "owns," and "passed_by." In some examples, connections between objects may be one directional while other connections may be bidirectional. For example, the first car object 202 (Car A) is related to the second person object 220 (Person B) based on the connection type "owns." This is a one directional relationship because a person can own a car, but a car cannot own a person. By contrast, the first car object 202 (Car A) is related to the second car object 204 (Car B) based on the connection type "crashed." In this instance the connection is bidirectional because it defines an equal relationship in both directions. In some examples, a bidirectional connection may be treated as two separate one directional connections for purposes of analysis. In some examples, the knowledge graph 200 may not distinguish between one directional and bidirectional connections. Further, in some examples, a single pair of objects may be related based on multiple different connection types. For example, as shown in FIG. 2, the first car object 202 (Car A) is related to the second intersection object 214 (Intersection B) based on the connection type "crashed" and also related based on the connection type "passed_by."

The example knowledge graph 200 of FIG. 2 is relatively simple for purposes of explanation. In some instances, a knowledge graph may include a far greater number (e.g., tens, hundreds, thousands, or more) of different object types with many more instances (e.g., tens, hundreds, thousands, or more) of each object type that are all interrelated by connections associated with a far greater number (e.g., tens, hundreds, thousands, or more) of connection types. The complexity of such interrelated systems of information cannot reasonably be comprehended by a human. Accordingly, returning to FIG. 1, computers are implemented to enable a user to specify user queries 110 to retrieve relevant information of interest represented within the knowledge graph 102. As shown in the illustrated example of FIG. 1, the user queries 110 are processed by a query language parser 112 to determine the information requested by the user 108. The information of interest is then retrieved and provided back to the user 108. The particular query language used may depend on the nature of the underlying database. For example, if the underlying database represented by the knowledge graph 102 is a relational database, the user 108 may use the Structured Query Language (SQL). If the underlying database is a graph database, the user may use a different suitable query language (e.g., SPARQL, Gremlin, etc.).

If the feedback obtained from a user query is not exactly what the user 108 was looking for, the user 108 may tune or refine the query and try again. This is a typical approach for database queries. As mentioned above, such an approach is limited by the ability of the user 108 to know how to craft a suitable query to capture the information the user desires. However, with ever increasing amounts of data being processed, classified, and organized in more complicated ways based on advancement in machine learning systems generating such data, it is likely that users will be unable to appreciate and, therefore, uncover hidden insights in a database. Accordingly, examples disclosed herein extract contextual information from the user queries (block 114) and use such information to generate suggested queries that are aligned with the apparent interests of the user (as indicated by the user queries). The suggested queries may capture more nuanced aspects of the information embedded within the knowledge graph 102 that might be missed by the user queries. Generating suggested queries is accomplished by combining the contextual information from the user queries (block 114) with the results of an independent analysis of the knowledge graph to identify important objects and connections therein (block 116). More particularly, examples disclosed herein quantify or assign importance values to different types of connections between different pairs of objects in the knowledge graph 102 based on the number of each different type of object in the knowledge graph, the number of each different type of connection in the knowledge graph, the average number of connections associated with each different type of object, and the standard deviation of the number of connections associated with individual objects corresponding to each different type of object.

As used herein, the importance of an object and/or connection refers to the likelihood that meaningful insights may be gleaned from such objects and/or connections. In some examples, a higher number of a particular object type in the knowledge graph 102 is assumed to indicate such object type is of greater importance in the knowledge graph (e.g., is associated with more meaningful insights). Similarly, in some examples, a higher number of a particular connection type in the knowledge graph 102 is assumed to indicate such connection type is of greater importance in the knowledge graph. Likewise, in some examples, a higher average number of connections associated with a particular object type is assumed to indicate such object type is of greater importance. Further, in some examples, where there is greater variability in the number of connections between objects of certain types (as indicated by the standard deviations for such), it is assumed such objects and/or associated connections are more important.

In some examples, the contextual information extracted from the user queries (block 114) and the calculated importance values for objects and connections obtained from an analysis of the knowledge graph 102 (block 116) are combined in a session adaption process (block 118) to generate complex insights (block 120). The complex insights are then used to generate suggested queries (block 122) that are provided to the user 108. The user 108 may use the suggested queries to initiate additional user queries 110 of the database, thereby providing new contextual information to further refine and/or improve the suggested queries.

In some examples, additional analysis of the knowledge graph 102 may be performed based on the importance calculations for the objects and connections to generate graph summarizations (block 124). As described more fully below, the graph summarizations may be focused on the objects in the knowledge graph (sometimes referred to herein as micro-level summarizations). Additionally or alternatively, the graph summarizations may be focused on the connections between the objects in the knowledge graph (sometimes referred to herein as macro-level summarizations). Micro and macro-level summarizations of the knowledge graph 102 can provide additional insights in the nature, composition, and interrelationships of data stored in a database. Accordingly, in some examples, such data summaries may be provided to the user 108 (block 126) to inform the user about the characteristics of the data to facilitate the user in developing more nuanced and/or particular user queries and/or focus the queries on different aspects of the data not previously considered. Additionally or alternatively, in some examples, the result of the graph summarization (block 124) may be incorporated into the complex insight generation (block 120) so that the insights from the summarization are automatically represented in the suggested queries provided to the user 108.

Figure 3:
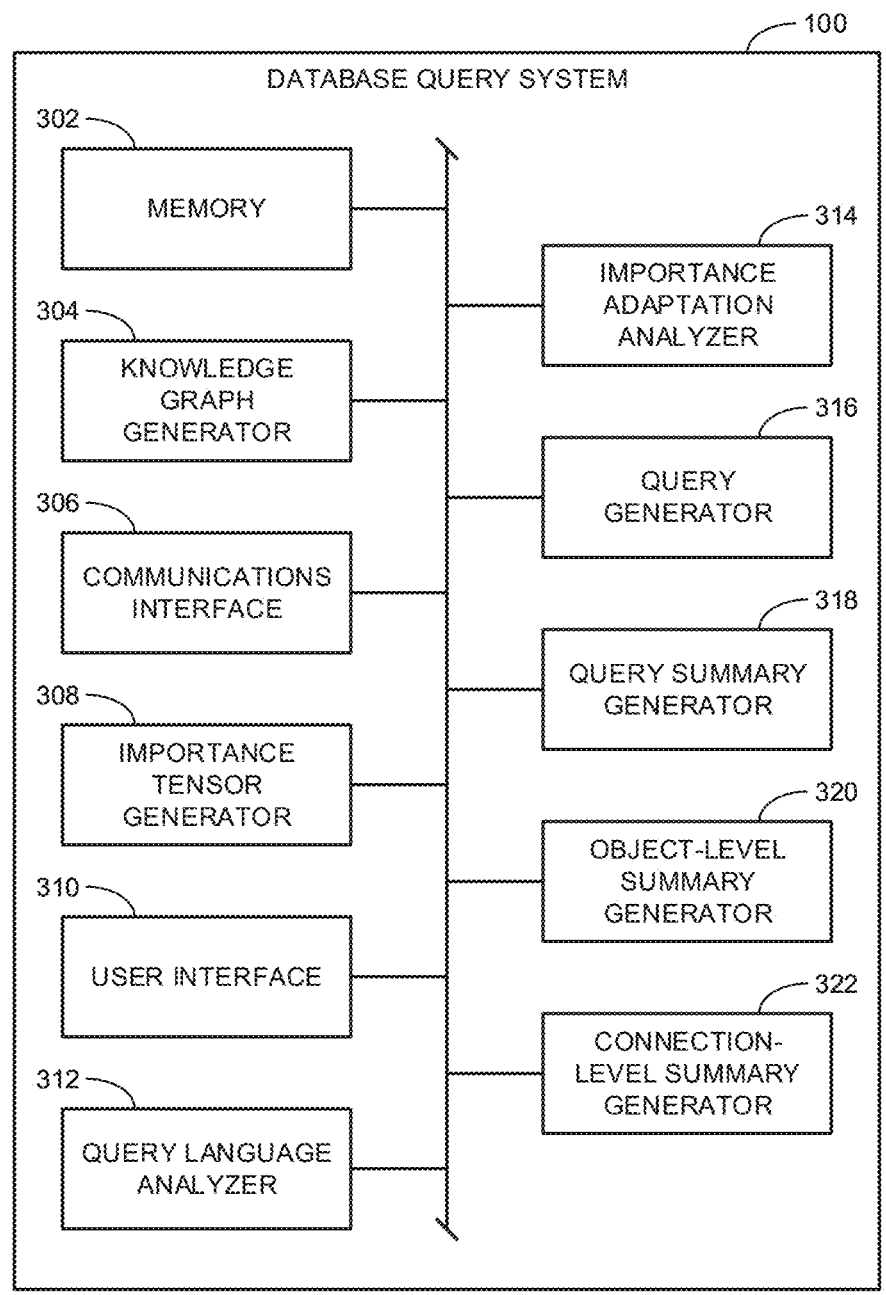
FIG. 3 is a block diagram illustrating an example implementation of the example database query system of FIG. 1 constructed in accordance with teachings disclosed herein.

FIG. 3 is a block diagram illustrating an example implementation of the example database query system 100 of FIG. 1 constructed in accordance with teachings disclosed herein. As shown in the illustrated example, the database query system 100 includes example memory 302, an example knowledge graph generator 304, an example communications interface 306, an example importance tensor generator 308, an example user interface 310, an example query language analyzer 312, an example importance adaptation analyzer 314, an example query generator 316, an example query summary generator 318, an example object-level summary generator 320, and an example connection-level summary generator 322.

The example memory 302 of FIG. 3 stores data contained in a database to be queried and/or a knowledge graph representative of such data. The database may be stored in any suitable type of database (e.g., a relational database, a graph database, a triplestore database, etc.). In some examples, due to the amount of data in the database, the memory 302 may be implemented in a distributed system (e.g., using multiple servers) and/or which may be remotely located from each other and/or from other components of the database query system 100. In some examples, a database to be queried may be stored independent of the rest of the components of the system 100. In some such examples, the system 100 accesses the database via the communications interface 306.

The example knowledge graph generator 304 of FIG. 3 generates a knowledge graph (e.g., the example knowledge graph 200 of FIG. 2) based on data stored in a corresponding database. Generation of the knowledge graph may be implemented using any suitable techniques. In some examples, the knowledge graph generator 304 updates a knowledge graph when data is either added to or removed from the underlying database. In some examples, the knowledge graph generator 304 may be omitted from the database query system 100 when the knowledge graph is generated independent of the system 100 (e.g., when the underlying database is stored independent of the system 100). In such examples, the database query system 100 accesses the knowledge graph via the communications interface 306.

The example communications interface 306 of FIG. 3 enables receipt of data to be stored in a database. As a specific example, the communications interface 306 may be in communication with one or more video surveillance systems to receive and store raw video data and/or associated metadata based on an analysis of the raw video data (e.g., using machine learning techniques) for storage in the database. In some examples, the analysis and processing of raw data may be incorporated into the database query system 100. In other examples, such analysis and processing may be performed by a separate system before being provided to the database query system 100. In some examples, as mentioned above, the communications interface 306 enables access to a database and/or associated knowledge graph that is generated, stored, and/or maintained by a separate system.

Whether a database and/or associated knowledge graph is generated and stored by the database query system 100 itself or accessed via the communications interface, the example importance tensor generator 308 of FIG. 3 analyzes the knowledge graph to determine the distribution of the types of objects and/or connections contained therein to then infer an importance of different aspects of the knowledge graph. In some examples, the importance tensor generator 308 generates an importance tensor to represent the importance of different types of connections between pairs of objects within the knowledge graph. More particular, the importance tensor generated by the importance tensor generator 308 is defined as $T \in \{\mathbb{R}^{N \times N \times M}|[0,1]\}$, where N is the number of different object types $v_T$ and M is the number of different connect types $e_T$. The value $T_{ijk} \in \mathbb{R}|[0,1]$ represents the importance of the connection type k between object types i and j. In some instances, the same pair of objects types i and j may be related based on more than one connection type. As a result, the importance tensor T is a tridimensional tensor. Further, inasmuch as the importance tensor is a separate data structure to the underlying database based on information extracted from a knowledge graph representative of the underlying database, the subsequent analysis and/or use of the importance tensor disclosed herein is agnostic to the nature of the underlying database structure. That is, examples disclosed herein may be implemented in connection with relational databases, graph databases, triplestore databases, and/or any other suitable type of database.

Figure 4:
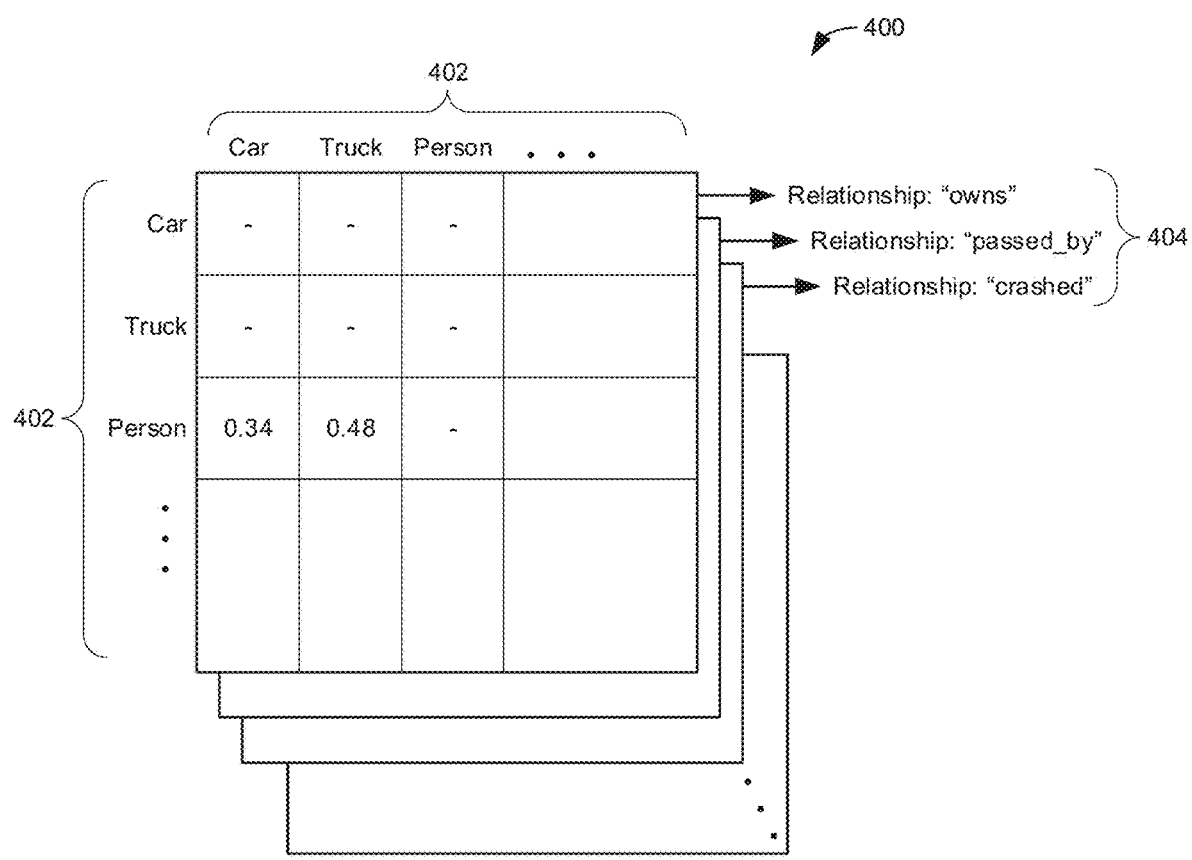
FIG. 4 is a representation of an example importance tensor generated by the example importance tensor generator of FIG. 3.

FIG. 4 is a representation of an example importance tensor 400 generated by the example importance tensor generator 308 of FIG. 3. For purposes of explanation, the example importance tensor 400 includes the same types of objects and connections as shown in the example knowledge graph 200 of FIG. 2. As shown in FIG. 4, the importance tensor 400 can be represented as an array of two dimensional matrices. Within each matrix, all of the different object types 402 in the knowledge graph are identified along both the rows and columns of a matrix, thereby defining each possible pair of objects in the knowledge graph. Further, there is a separate matrix corresponding to each different connection type 404 between the objects. Thus, each element or value in the importance tensor 400 corresponds to a particular type of connection between a particular pair of object types (including the possibility of a connection between two objects of the same type).

In many instances, the values in the importance tensor 400 will be relatively scattered or sparse. For instance, in the front matrix shown in the illustrated example of FIG. 4, which corresponds to the connection type "owns," there are only two values corresponding to the object pair "person-car" and the object pair "person-truck." The remaining elements within the matrix for the connection type "owns" are empty because none of the other pairs of objects are related based on the connection type "owns." Notably, in this example, the object pairs "truck-person" and "car-person" do not include an importance value within the matrix represented in FIG. 4 because the relationship is one directional and the importance value associated with the one directional relationship is represented in the reverse object pairs of "person-truck" and "person-car." For other types of connections, importance values may be included for symmetrical pairs of objects. The relatively few number of elements within the importance tensor 400 that are to contain importance values enables the determination of such values through sparse representation analysis techniques.

In some examples, an importance value is calculated for each connection type between each pair of object types (e.g., for each element in the importance tensor) to quantify an importance of the connection and the associated objects. As mentioned above, the importance of an object and/or connection refers to the likelihood that meaningful insights may be gleaned from such objects and/or connections. What is considered meaningful may depend on the nature of the data being analyzed and/or the nature in which the data is intended to be used. As a result, the particular metrics used to quantify the importance of particular connection types and associated pairs of objects may vary depending on the application in which teachings disclosed herein are implemented.

For purposes of explanation, in some examples, greater importance is assumed and/or inferred for object types that appear more frequently within the knowledge graph. For instance, in the example knowledge graph 200 of FIG. 2, there are three objects 202, 204, 206 of the type "car" but only one object 216 of the type "traffic light," from which it may be inferred that car objects 202, 204, 206 are more important. To quantify this metric, in some examples, a standardized or normalized number of objects of a particular object type within the knowledge is calculated in accordance with Equation 1:

$$\hat{V}^{v_T} = \frac{v(V^{v_T})}{v(G)} \in \mathbb{R}[0, 1] \qquad \text{Eq. 1}$$

where $V^{v_T}$ denotes the vertices (e.g., objects) of type $v_T$, G corresponds to the entire knowledge graph, and $v(\cdot)$ is the unary operator that extracts the number of vertices (e.g., objects) of a graph.

Similarly, in some examples, greater importance is assumed and/or inferred for connection types that appear more frequently within the knowledge graph. Accordingly, in some examples, a standardized or normalized number of connections of a particular object type within the knowledge is calculated in accordance with Equation 2:

$$R_{e_T} = \frac{e(E^{e_T})}{e(G)} \in \mathbb{R}[0, 1] \qquad \text{Eq. 2}$$

where $E^{e_T}$ denotes the edges (e.g., connections) of type $e_T$, G corresponds to the entire knowledge graph, and $e(\cdot)$ is the unary operator that extracts the number of edges (e.g., connections) of a graph.

Further, in some examples, greater importance is assumed and/or inferred for object types that have a greater number of connections. In many instances, different objects of the same type may be associated with different numbers of connections. Accordingly, in some examples, this metric is quantified based on the average number of connections associated with the particular object type. For example, in FIG. 2, the first car object 202 (Car A) is associated with 5 connections, the second car object 204 (Car B) is associated with 4 connections, and the third car object 206 (Car C) is associated with 2 connections. Thus, the average number of connections associated with the object type "car" in the knowledge graph 200 of FIG. 2 is (5+4+2)/3=3.67. This can be expressed generically for connections associated with any particular type of object as follows:

$$\mu^{v_T} = \frac{1}{n}\sum_{i=i}^{n} e(V_i^{v_T}) \qquad \text{Eq. 3}$$

where n is the number of objects of the type $v_T$ (e.g., $n=V^{v_T}$). For purposes of evaluation relative to the average number of connections associated with different objects, in some examples, a standardized or normalized number of connections associated with each particular object type is calculated as follows:

$$\hat{\mu}^{v_T} = \frac{\mu^{v_T} - \min(\mu)}{\max(\mu) - \min(\mu)} \in \mathbb{R}[0, 1] \qquad \text{Eq. 4}$$

where min(μ) is the minimum number of connections associated with any particular object of the type $v_T$ (e.g., 2 connections corresponding to the third car object 206 in the example knowledge graph 200 of FIG. 2) and max(μ) is the maximum number of connections associated with any particular object of the type $v_T$ (e.g., 5 connections corresponding to the third car object 206 in the example knowledge graph 200 of FIG. 2).

As mentioned above, different objects of a particular type can have a different number of connections than other objects of the same type. In some examples, this variability is used as a separate metric of importance. More particularly, in some examples, greater importance is assumed and/or inferred for higher standard deviations in the number of connections associated with objects of a particular type. The standard deviation of the number of connections associated with a particular object type is calculated as follows:

$$\sigma^{v_T} = \sqrt{\frac{\sum_{i=1}^{n}(\mu_{v_T} - e(v_i^{v_T}))^2}{n-1}} \quad \text{Eq. 5}$$

In some examples, a standardized or normalized standard deviation is calculated as follows:

$$\hat{\sigma}^{v_T} = \frac{\sigma^{v_T} - \min(\sigma)}{\max(\sigma) - \min(\sigma)} \in \mathbb{R}[0,1] \quad \text{Eq. 6}$$

where min(σ) is the minimum standard deviation for number of connections associated with any particular object type and max(σ) is the maximum standard deviation for number of connections associated with any particular object type.

In some examples, a weight for each type of object in the knowledge graph is obtained by multiplying the results of Equations 1, 4, and 6 as follows:

$$C_{v_T} = \hat{\mu}^{v_T} \cdot \hat{\sigma}^{v_T} \cdot \hat{V}^{v_T} \in \mathbb{R}[0,1] \quad \text{Eq. 7}$$

A weight for each type of connection in the knowledge graph is assigned as the result of Equation 2. With weights defined for each object type and each connection type, the example importance tensor generator 308 may calculate the individual importance values used to populate an importance tensor T by multiplying the two weights associated with each object type corresponding to the objects in an object pair of the tensor and further multiplying the result by the weight of the corresponding connection type for the object pair. This can be expressed mathematically as follows:

$$T(i,j,k) = C_i C_j R_k; \forall i,j \in [0,1,\ldots,N]; \\ k \in [0,1,\ldots,M] \quad \text{Eq. 8}$$

As described more fully below, the importance tensor defined by Equation 8 is an initial assessment of the importance of connections and objects in a knowledge graph. This importance tensor is based exclusively on an analysis of the data contained in the knowledge graph itself without regard to feedback from a user. However, the importance tensor may be subsequently modified or tuned based on user inputs so that the importance values in the tensor more closely align with what a user has indicated as important while performing queries during a particular query session. As described more fully below, topics of importance to a user may be indicating based on particular objects, object types, connections, and/or connection types of interest to the user as identified by parsing prior queries of the user searching the database. For purposes of explanation and clarity, the importance tensor as calculated by the importance tensor generator 308 based exclusively on the knowledge graph data is referred to herein as a global importance tensor (T). By contrast, an importance tensor that is modified or adapted based on the interests of a user during a particular query session is referred to herein as a session importance tensor (S). As used herein, a session refers to a sequence of queries performed in a determined time window by a specific user. In some examples, the particular length of the time window and segmentation of sessions is an application and user-specific parameter of the system. In some examples, a user may choose to save a particular session importance tensor at the end of one session to be used as the starting point of a different session at a later point in time.

The importance values in the global importance tensor T are sensitive to the current data represented in the knowledge graph analyzed by the importance tensor generator 308. Thus, if data is added to or removed from the underlying database, the importance tensor will no longer accurately reflect the data distribution characteristics of an updated knowledge graph. In some examples, to update the importance metrics in an efficient manner, the totals for the number of each type of object and each type of connection can be updated (e.g., incremented or decremented) upon every insertion or deletion query. Other calculations that are more computationally intensive can be delayed until a scheduled database maintenance process and/or when processing capacity is available to perform such computations. In some examples, the frequency of the recalculation of the global importance tensor T depends upon the nature of the workload of the system. For instance, heavy write workloads (where data is being added frequently to the database) may update relatively frequently to reflect changes faster. By contrast, heavy read workloads (or read only operations) will be less affected such that recalculation of the global importance tensor T does not need to occur as frequently.

The example user interface 310 of FIG. 3 enables a user to interact with the database query system 100. In some examples, it is through the user interface 310 that a user specifies or provides queries to access or retrieve information from a database. In some examples, the example query language analyzer 312 of FIG. 3 analyzes such user-input queries to determine contextual information indicative of items of interest and/or importance to the user. More particularly, in some examples, the query language analyzer 312 parses a user query to identify the object types and/or the connection types that the user is interested in based on the contents of the user query. In some examples, the query language analyzer 312 parses a user query into a set of triplets defined by $$Y = \{i,j,k\} \quad \text{Eq. 9}$$

where i and j are object types and k is a connection type corresponding to a relationship between the two objects i and j.

The example importance adaptation analyzer 314 of FIG. 3 uses the triplets generated by the query language analyzer 312 in conjunction with the global importance tensor T generated by the importance tensor generator 308 to define a session importance tensor S that is used to provide the user with suggested queries. More particularly, at the beginning of a user session, the importance adaptation analyzer 314 defines the global importance tensor as the session importance tensor S. That is, the global importance tensor T is used as a starting point from which suggested queries may be determined. After the user has executed a query the contextual information gleaned from the query indicative of the user's interests is used to modify or update the session importance tensor S to be biased towards objects and/or connections of interest to the user. The updated session importance tensor S is then used to provide additional query suggestions to the user. As a result, the session importance tensor S adapts over time in accordance with user interactions with the system.

In some examples, the importance adaptation analyzer 314 uses the session importance tensor S (initially corresponding to the global importance tensor T) to parameterize a function $f_s(i,j,k) \rightarrow \mathbb{R} |[0,1]$ that is a mapping of graphs paths of length one (e.g., individual connections between objects) in the knowledge graph. That is, the function $f_s$ is defined to return the importance value for the kth connection type between the ith and jth object types as contained in the session importance tensor S. With the function $f_s$ defined, the importance adaptation analyzer 314 compute a vanilla loss function for the session importance tensor S as follows:

$$L(S) = \Sigma_{i=1}^{Y} |f_s(y_i) - 1(y_i)|_2 \quad \text{Eq. 10}$$

where $1(y_i)$ is an indicator function that yields a tensor with the same shape as the global importance tensor T with ones in the $y_i$ position and zero otherwise.

After computing the loss function, the importance adaptation analyzer 314 updates or adapts the session importance tensor S based on the negative gradient of the loss function as follows:

$$S = S - \alpha \nabla_s L(S) \quad \text{Eq. 11}$$

where $\alpha$ is a learning rate parameter that defines the speed at which the importance values are shifted towards the interests of the user identified by the query language analyzer 312. In some examples, the value for the learning rate parameter is set by the user. The particular value for the learning rate parameter may depend on many application specific factors such as, for example, the mean length of the query session, the length of individual queries, and the size of the database. In some examples, a suitable value for the learning rate parameter may be determined by implementing an empirical tuning session until a desired degree of responsiveness and adaptation is obtained.

Updating the session importance tensor S by the negative gradient of the loss function causes the importance values corresponding to objects and connections the user has explicitly shown interest in based on a prior user query to increase while the importance values of other objects and connections decrease. In this manner, the session importance tensor is updated to bias its importance values to the context of a current query session as determined by the particular queries executed by the user.

The example query generator 316 of FIG. 3 uses the updated session importance tensor to generate suggested queries for the user to consider for use in a subsequent search query. A query can be expressed as a path in the knowledge graph from a first node n (e.g., a first object) to a second node m (e.g., a second object) that traverses a sequence or series of relations Ψ (e.g., individual connections. The shortest path in the graph includes only a single connection that extends directly between the beginning object and the ending object of the path. However, longer paths may include one or more intermediate objects that are linked by corresponding connections therebetween. A single segment of such a path corresponding to one connection is referred to herein as a hop in the path. That is, the path begins at a first object and hops from one intermediate object to the next intermediate object (following a particular connection) until arriving at the final object in the path.

Any path in the knowledge graph can be defined by Equation 12.

$$q^* = \{n \in V, m \in V, \Psi \subset E\} \quad \text{Eq. 12}$$

The importance of any particular path can be computed by multiplying all of the importance values associated with each hop (each connection) along the length of the path:

$$I_{q^*} = \prod_{i=1}^{|q_\Psi^*|} S(q_n^*, q_m^*, q_{\Psi_i}^*) \quad \text{Eq. 13}$$

In some examples, the query generator 316 defines multiple paths through the knowledge graph and ranks the paths based on the importance as calculated using Equation 13 to identify the paths that may be useful as the basis for a query to be suggested to the user. In some examples, the query generator 316 may select the beginning point of the path (e.g., the first object in the path) to correspond to a type of object specified by the user in a previously executed user query and/or that is associated with a particular type of connection specified in the user query.

As a specific example, a user may query the database associated with the knowledge graph 200 of FIG. 2 along the lines of "Find all cars that pass by intersection A." This query, although simplistic for purposes of explanation, indicates that the user is interested in objects of the type "car" and objects of the type "intersection" (and specifically intersection A). Further, the example query indicates the user is interested in connections of such objects of the type "passed_by." In some examples, these items of interest are defined as a triplet (Y) by the query language analyzer 312 as described above to enable the update of the session importance tensor by the importance adaptation analyzer 314. The query generator 316 may then generate or define multiple paths through the knowledge graph 200 and calculate their respective importance based on the updated importance values in the session importance tensor. In some examples, the query generator 316 may generate the paths beginning at the first intersection object 212 (Intersection A) because the user expressed particular interest in that object.

In some examples, the hops followed by the query generator 316 when defining the different paths to analyze may be selected in a random manner. In some examples, all paths from an initial starting point may be analyzed up to a certain number of hops. In some examples, the hops followed by the query generator 316 in defining different paths are selected based on particular path generation criteria. For example, a highest importance criterion may be specified to define paths that begin at a certain object and follow the hops (e.g., connections) corresponding with the highest importance value available at each node (e.g., object) along the path. In some such examples, where two or more connections associated with an object in the path have the same importance value, and which is the highest importance value of any connection associated with the object, the two or more connections are followed as separate hops associated with separate branching paths. This is demonstrated graphically in FIG. 5.

Figure 5:
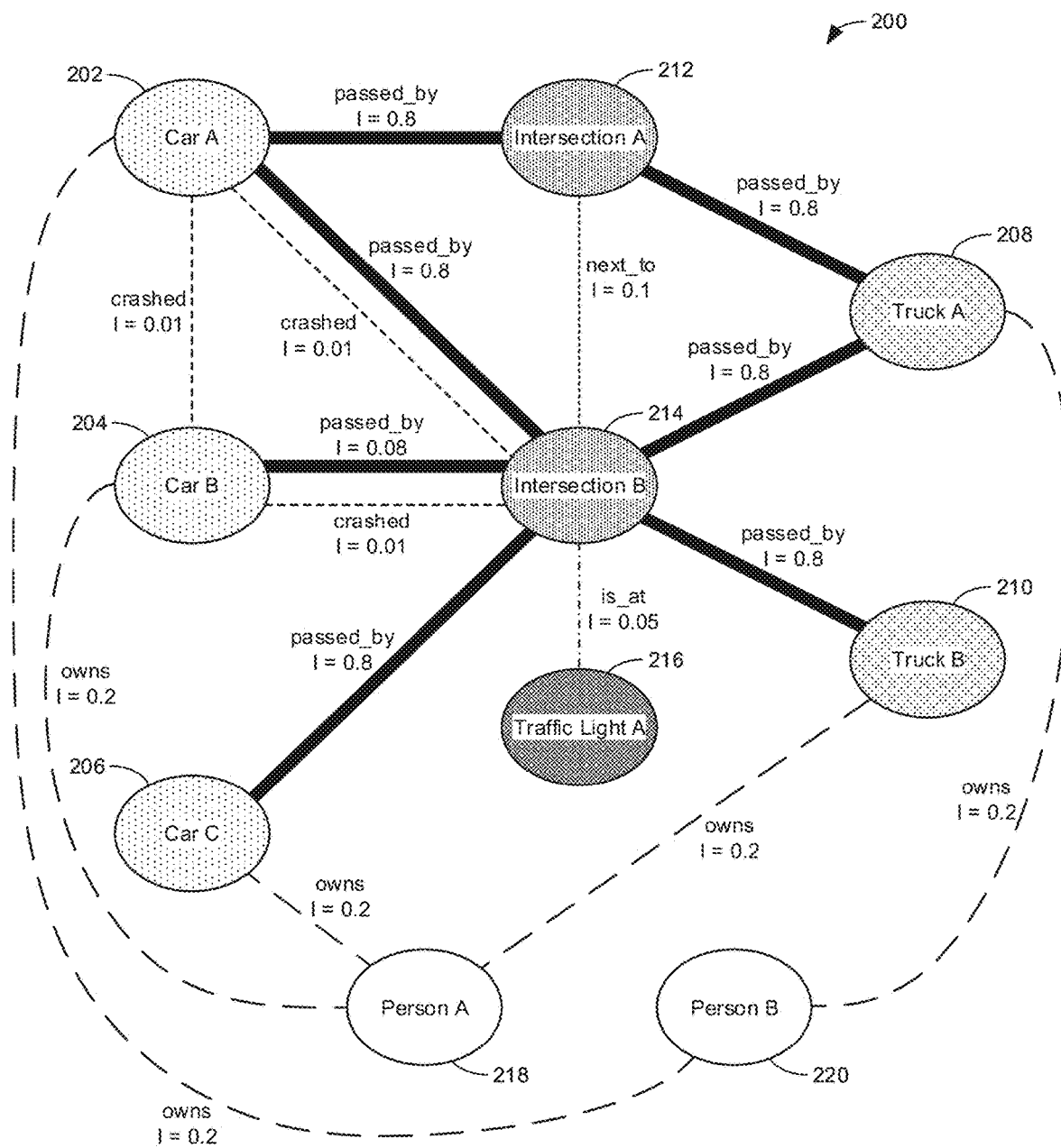
FIGS. 5 and 6 illustrate the example knowledge graph of FIG. 2 with different paths highlighted based on different example importance values assigned to different connections in the graph.

FIG. 5 illustrates the example knowledge graph 200 of FIG. 2 with importance values assigned to the different connections in the graph. While the importance values change with time, based on updates to the session importance tensor, at the time represented in the illustrated example, the connection type with the highest importance value (I=0.8) is the connection type "passed_by." The paths defined by the query generator 316 are represented by the darkened connections. That is, as shown in the illustrated example, assuming a beginning point corresponding to the Intersection A 212, the path immediately branches in two directions toward Car A 202 and Truck A 208 because both connections correspond to the connections associated with Intersection A 212 having the highest importance (0.8). Following the path to Car A 202, there are again two connection associated with the highest importance value (0.8) for that object including the connection back to Intersection A 212 and the connection to Intersection B 214. Intersection B is associated with 5 different connections all sharing the same highest importance value (0.8). Thus, the path again branches to Car B 204, Car C 206, Truck B 210, and Truck A 208. Moving to each of these objects it can be seen that the connection of highest importance in each instance corresponds to connections already defined in the path(s). Accordingly, the query generator 316 defines the different objects as the ending point for the different branching paths. Based on these identified paths, the query generator 316 may generate relevant queries to suggest to the user such as "Find all vehicles that pass by the current and nearby intersections." This suggestion expands upon the user's original query focused on cars to include all vehicles, thereby capturing data associated with the truck objects 208, 210. Further, this suggestion expands the query beyond simply Intersection A, to other nearby intersection. As a result, a user is provided with insights to expand their search and/or to focus on other aspects other than what the user may have originally considered.

Figure 6:
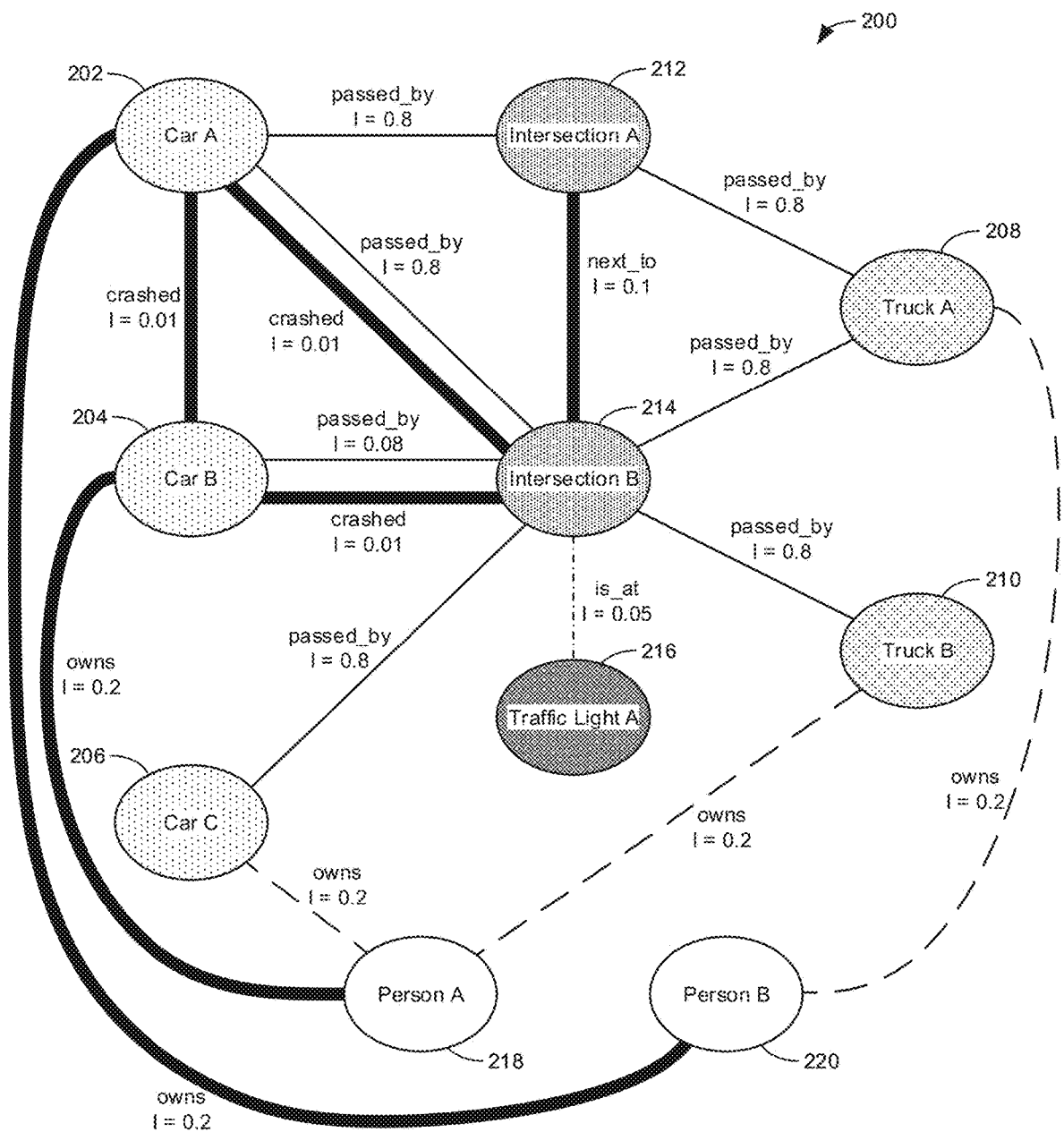

FIG. 6 illustrates different example paths within the example knowledge graph 200 of FIG. 2 that may be defined by the query generator 316 based on different path generation criteria. Specifically, the paths (shown by the darkened lines) in FIG. 6 are based on a maximum decay (e.g., lowest importance) criterion. Such a criterion defines paths that begin at a certain object and follow the hops (e.g., connections) corresponding with the lowest importance value available at each node (e.g., object) along the path. Hops corresponding to the lowest importance values may be of interest to a user because such connections correspond to the least common types of connections and/or the least common types of objects. As such, following paths of the lowest importance is likely to lead to the uncovering of relatively rare aspects of the data stored in the database that users might not think to search for by themselves. As with the highest importance criterion, in some such examples, where two or more connections associated with an object in the path have the same lowest importance value, the two or more connections are followed as separate hops associated with separate branching paths. Thus, with reference to FIG. 6, the connection of lowest importance value associated with Intersection A 212 is the connection with Intersection B 214 (e.g., with an importance value of 0.1). Intersection B 214 is associated with two different connections having the same lowest importance value (0.01) including the "crashed" connection with Car A 202, and the "crashed" connection with Car B. Moving to Car A 202 and Car B 204, the lowest importance connections include the connection between the two objects and the connections extending back to Intersection B 214. In some examples, the next hop(s) along a path are defined corresponding to the connections of lowest importance (or of highest importance as in the example of FIG. 5) that have not already been defined as a hop. Thus, with reference to the example in FIG. 6, after defining the hop between Car A 202 and Car B 204, the next lowest connections (and the only remaining connections for Cars A and B 202, 204) are the "owns" connections form Car A 202 to Person B 2220 and the "owns" connection from Car B 204 to Person A 218. The path could continue onto other objects based on an identification of the next lowest connections not already associated with a hop in a path. However, in some examples, path generation is limited to a specified number of degrees or hops. Accordingly, in the example of FIG. 6, the generated paths end at Person A 218 and Person B 220. Based on these identified paths, the query generator 316 may generate relevant queries to suggest to the user, such as "Find all persons that own a car that crashed in the current or nearby intersection." This suggestion highlights aspects of the data not focused on by the user and may not have even been considered as something to query the database about.

In some examples, the query generator 316 provides multiple suggested queries to the user based on different paths along with an indication of the calculated importance for the paths based on Equation 13 as outlined above. In this manner, the user can assess whether to pursue the suggestions or try something different.

In some examples, the query generator 316 automatically generates the suggested queries in a structured format corresponding to a syntax of a query language associated with the database. That is, in some examples, the query generator 316 translations the hops between different objects along a path into a suitable query language that a user can directly execute as a new query. In some examples, the user may be given the opportunity to tune or revise a particular suggested query before implementing the same. If the underlying database is a relational database such that a relational query language is used (e.g., SQL), the hops between objects will be expressed as JOIN operations between the tables corresponding to those objects. In such examples, the JOIN operations are parameterized using the associated connections, which are represented as "foreign keys" in each table based on standard representations of data in a relational model. By contrast, if the underlying database is a graph database such that a graph query language is used (e.g., SPARQL, Gremlin, etc.), the hops between objects will be directly mapped one-to-one to neighbor hops in the query.

In many instances, suggested queries generated by the query generator 316 are based on paths including a large number of hops that result in a relatively long string when formatted according to the relevant query language syntax. For example, a potential insight that could be queried based on the paths identified in the illustrated example of FIG. 6 could be based on the first object in the paths (Intersection A 212) the object type at the end of the paths (e.g., a "person" object) and one or more middle elements (object types and/or connection types) between the beginning and ending of the paths (e.g., the connection type "crashed or object type "car"). As a specific example, a suitable query may be "Find 'Intersection A' connected to 'Person' through 'crashed'." Although this can be stated relatively simply, the syntactically correct query expressed using a Gremlin-like query language would look like the following:

V("type", "Intersection", "id", "A").neighbor ("next_to", "type", "Intersection").neighbor ("crashed", "type", "Car").neighbor("own", "type", "person")

The above query is based on a relatively simple example associated with a path containing only a few hops. Much longer paths would result in much longer and more complicated strings of text formatted according to the proper query language syntax. With the suggested queries being so long and complicated it may not be readily apparent to a user what sort of insights the query is seeking to find. Accordingly, in some examples, the query summary generator 318 of FIG. 3 generates a summary of the query that is not based on the syntax of the query language and provided to the user along with the suggested query to enable a user to more easily and/or quickly understand the nature of the suggested query. In some examples, the summary of the query may be limited to identifying the beginning and ending of the path and a single element (connection or object) within the middle of the path such as the following:

"Intersection A" connected to "Person" through "crashed"

This high level summary provides the user with a basic understand of the basis for the suggested query including the beginning point and where it ended up. In some examples, the user may be given the option to expand the summary. In such examples, the query summary generator 318 may identify additional elements within the path such as the following:

"Intersection A" connected to "Person" through "crashed" and

"Car" and "Intersection B"

In some examples, a user may select to expand the query summary further to the point that all connections and objects along the path defining the query are identified.

Once the user has identified a suggested query that is of interest, the user may select the suggested query for further tuning before implementing the query. By selecting the suggested query, the user has indicated further interest in the concepts identified within the query. As such, the elements within the query are then used to again update the session importance tensor as described above. The newly updated session importance tensor is then used to generate new suggested queries that are more closely aligned with the interests of the user. This process can repeat multiple times with the session importance tensor and resulting suggested queries evolving and/or adapting to each successive query executed by the user. As a result, the example database query system 100 is able to assist a user in identifying helpful queries by responding and adapting to queries the user has already provided.

The example database query system 100 may provide additional assistance to a user developing queries for a database by automatically generating and providing graph summarizations for the knowledge graph. In some examples, the graph summarizations describe the knowledge graph based on the clustering of objects in the graph. Additionally or alternatively, the graph summarizations describe the knowledge graph based on the clustering of connections within the graph. Clustering analysis based on objects in the knowledge graph as disclosed herein facilitate a user's understanding of individual vertices or objects within the graph and is, therefore, referred to herein as object-level summarization or micro-level summarization. By contrast, clustering analysis based on connection types as disclosed herein can facilitate a user's understanding of how different types of connections are dispersed across the graph and is, therefore, referred to herein as connection-level summarization or macro-level summarization. Understanding either the macro or micro level structural characteristics of the knowledge graph based on the graph summarization techniques disclosed herein can enable a user to develop additional queries that may not have otherwise been considered.

The example object-level summary generator 320 of FIG. 3 generates graph summarization for the micro-level (object-level). Such object-level graph summarizations are based on a similarity assessment via clustering of the objects within the knowledge graph across different types of connections. More particularly, in some examples, the connection-level summary generator 322 generates the object-level summarization by initially performing a Laplacian spectral embedding on each different connection type of the global importance tensor T generated by the importance tensor generator 308. That is, for each connection type k of the tensor $T_K = T((i, j, k=K)) = C_i C_j R_{K|k=K}$; $\forall i,j \in [0, 1, \ldots, N]$, where the importance tensor is conditioned on connection type K, the Laplacian may be calculated as follows:

$$LAP_o := D - T_K \qquad \text{Eq. 14}$$

where D is a degree matrix (e.g., a diagonal matrix with the value of the elements corresponding to the number of edges or connections associated with each node or object in the knowledge graph). From here, the example object-level summary generator 320 normalizes the Laplacian matrix and makes it symmetric via $$LAP_n = I - D^{-0.5} T_K D^{-0.5} \qquad \text{Eq. 15}$$

Since the normalize Laplacian matrix is positive semi-definite, the embedding on the Laplacian matrix can be numerical derived based on eigen-decomposition using $$LAP_n = M \Lambda M^T \qquad \text{Eq. 16}$$

where $\Lambda$ is a diagonal matrix with the diagonal $\lambda$ being a vector of scalar eigenvalues $\lambda_1, \ldots, \lambda_n$ ranked in non-increasing order of their absolute values. The matrix M contains the eigenvectors of the normalized Laplacian matrix associated with the eigenvalues. Using the solution of Equation 16, the example object-level summary generator 320 embeds the knowledge graph into a low-rank representation defines as $$X := M_d \Lambda_d^{1/2} \in R^{n \times d} \qquad \text{Eq. 17}$$

where $\Lambda_d$ contains the largest d eigenvalues sorted in non-increasing order and $M_d$ contains the associated d eigenvectors. This embedding process is repeated for each different connection type represented in the global importance tensor T.

After the embedding so that the objects within the knowledge graph and their associated connection patterns are transformed to a low rank representation $X = \lambda_d M_d^T \in R^{n \times d}$, the example object-level summary generator 320 implements a suitable clustering operation (e.g., K-mean or expectation maximization) on X to identify different communities or clusters of objects. That is, the result of the Laplacian embedding and clustering is the partitioning of the knowledge graph based on the connections types between the objects, the size of the clusters or communities, and the commonality of the clusters or communities.

More particularly, an output of the micro object-level graph summarization process identifies the number of clusters or communities for each connection type, where each cluster or community contains particular objects $v_1, \ldots, v_m$. Based on this information, the example object-level summary generator 320 may identify a particular object within the knowledge graph having a most concentrated probability distribution indicative of an object type with a strong membership across multiple clusters. In some examples, the object-level summary generator 320 may identify multiple objects within the knowledge graph having relatively highly concentrated probability distributions (e.g., above a certain threshold). Additionally or alternatively, the example object-level summary generator 320 may identify a particular object within the knowledge graph having a flattest probability distribution indicative of an object type that is not clearly grouped into any particular cluster across the different connection types. In some examples, the object-level summary generator 320 may identify multiple objects within the knowledge graph having relatively flat probability distributions (e.g., within a certain threshold). Providing such information and/or identifying objects within the knowledge graph with such characteristics can assist a user in identifying particular objects and/or object types that may worth including in one or more queries based on the interests of the user.

The example connection-level summary generator 322 of FIG. 3 generates graph summarization for the macro-level (connection-level). Such connection-level graph summarizations are based on a similarity assessment via graph matching between each type of connection. Specifically, the example connection-level summary generator 322 analyzes all the connections of each particular connection type in the knowledge graph as a separate graph. Each of these connection-type-specific graphs still retain all of the objects within the full knowledge graph. As such, the separate graphs all share the same objects but differ based on the connections between the objects. In some examples, each different pair of connection-specific graphs are compared using a graph matching technique to calculate the similarities (or differences) between the connection-specific graphs. The difference between two graphs may be quantified using graph matching techniques by a metric that is referred to herein as the distance between the two graphs. In some examples, the distance metric for each pair of connection-specific graphs is derived using the fast assignment quadratic (FAQ) programming method.

In some examples, the distance metric between every pair of connection-specific graphs is used to populate a square distance matrix D (also known as a dissimilarity matrix). Specifically, each (i,j)-entry in the distance matrix D denotes the distance between connection-specific graph i and connection-specific graph j. In some examples, the distance matrix D is provided as an input to a deep neural network (DNN) to extract features indicative of similarities and/or dissimilarities between the different connection-specific graphs. More particularly, in some examples, a three-layer sparse autoencoder is applied in an unsupervised manner. The extracted features correspond to the internal embedding layer from the similar matrices between the different connection types. This embedding layer may be denoted by $X_G$, which may be further processed by a clustering analysis (e.g., K-means clustering) to identify which sets of connection types associated with the same set of objects within the full knowledge graph are similar or belong to the same cluster. In other words, the macro-level graph summarization provides an indication of how the connections between different objects in the knowledge graph remain consistent or vary across different types of connections.

Figure 7:
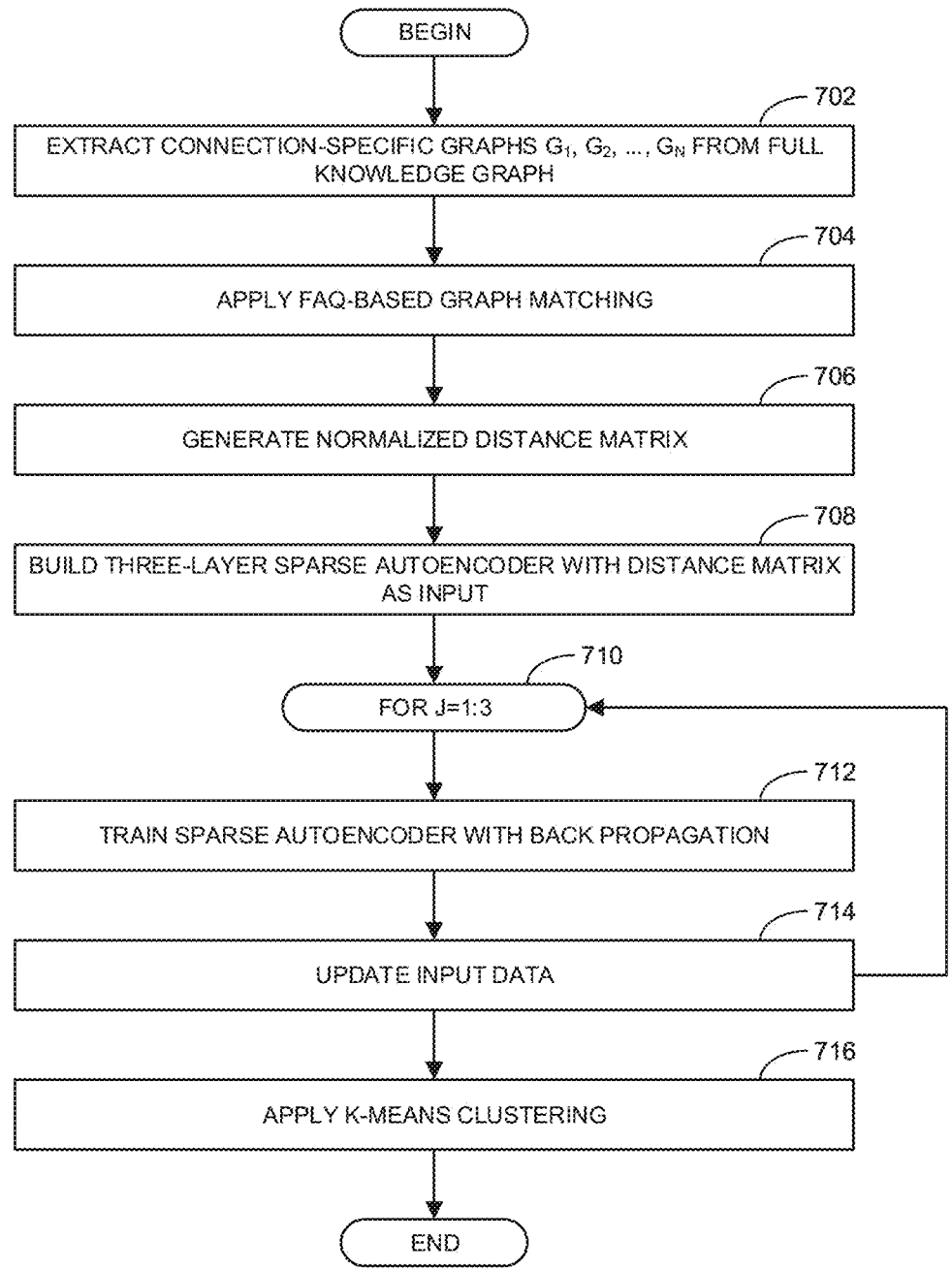
FIG. 7 illustrates an example process flow for the macro-level graph summarization process implemented by the example connection-level summary generator of FIG. 3.

FIG. 7 illustrates an example process flow for the implementation of the macro-level graph summarization process implemented by the example connection-level summary generator 322. As shown in the illustrated example, the process begins at block 702 where connection-specific graphs $G_1, G_2, \ldots, G_N$, are extracted from the full knowledge graph. At block 704, a FAQ-based graph matching process is implemented to calculate distances (dissimilarities) between different pairs of the connection-specific graphs. At block 706, a normalized square distance matrix is generated. At block 708, a three-layer sparse autoencoder is constructed to perform an iterative DNN analysis of the distance matrix. As represented by block 710, the DNN iterates from j=1 to j=3, indicative of three hidden layers in the sparse autoencoder. While the autoencoder represented in the illustrated example includes three hidden layers, in other examples, a different number of hidden layers may be used. The iterative process includes training the sparse autoencoder with back propagation (block 712) and updating the input data (e.g., the distance matrix) (block 714). The result of the iterative DNN analysis includes the extract features of the distance matrix represented in the internal embedding layer $X_G$. Thereafter, at block 716, K-means clustering is performed on the internal embedding layer to identify groups or clusters of different types of connections within the knowledge graph.

An output of the micro object-level graph summarization process indicates how the different connection types in the knowledge graph across the objects are similar or dissimilar. For instance, the example connection-level summary generator 322 may indicate that a first set of connection types $\{k_1, \ldots, k_N\} \in \{1, \ldots, M\}$ are very similar (e.g., relative to a first threshold) based on graph matching distance and K-means clustering, while second set of connection types $\{k_i, \ldots, k_{N_i}\} \in \{1, \ldots, M\}$ are very different (e.g., relative to a second threshold) based on graph matching similarity (e.g., the reverse of graph distance) and K-means clustering. Such information is helpful for a user to reduce the size of queries when different connection types of very similar. That is, if a number of different connection types are highly similar, the user may perform a query based on one such connection type to retrieve the same information that would be expected by performing a queries based on all of the similar connection types. Additionally or alternatively, the macro-level graph summarization can help a user to identify alternate queries based on dissimilar connection types that are likely to uncover different information that might otherwise be missed if only one such connection type were used in a query.

In some examples, the graph summarization processes may be updated whenever new data is added to the underlying database. More specifically, in some examples, the object-level summary generator 320 may repeat the Laplacian embedding and cluster analysis each time a new object is added (whether a new object type or an additional instance of an existing object type). The connection-level summary generator 322 may repeat the graph matching and cluster analysis each time a new type of connection is added.

While an example manner of implementing the example database query system 100 of FIG. 1 is illustrated in FIG. 3, one or more of the elements, processes and/or devices illustrated in FIG. 3 may be combined, divided, re-arranged, omitted, eliminated and/or implemented in any other way. Further, the example memory 302, the example knowledge graph generator 304, the example communications interface 306, the example importance tensor generator 308, the example user interface 310, the example query language analyzer 312, the an example importance adaptation analyzer 314, the example query generator 316, the example query summary generator 318, the example object-level summary generator 320, the example connection-level summary generator 322, and/or, more generally, the example database query system 100 of FIG. 1 may be implemented by hardware, software, firmware and/or any combination of hardware, software and/or firmware. Thus, for example, any of the example memory 302, the example knowledge graph generator 304, the example communications interface 306, the example importance tensor generator 308, the example user interface 310, the example query language analyzer 312, the an example importance adaptation analyzer 314, the example query generator 316, the example query summary generator 318, the example object-level summary generator 320, the example connection-level summary generator 322 and/or, more generally, the example database query system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example memory 302, the example knowledge graph generator 304, the example communications interface 306, the example importance tensor generator 308, the example user interface 310, the example query language analyzer 312, the an example importance adaptation analyzer 314, the example query generator 316, the example query summary generator 318, the example object-level summary generator 320, and/or the example connection-level summary generator 322 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database query system 100 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the database query system 100 of FIGS. 1 and/or 3 is shown in FIGS. 8-13. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 4, many other methods of implementing the example database query system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
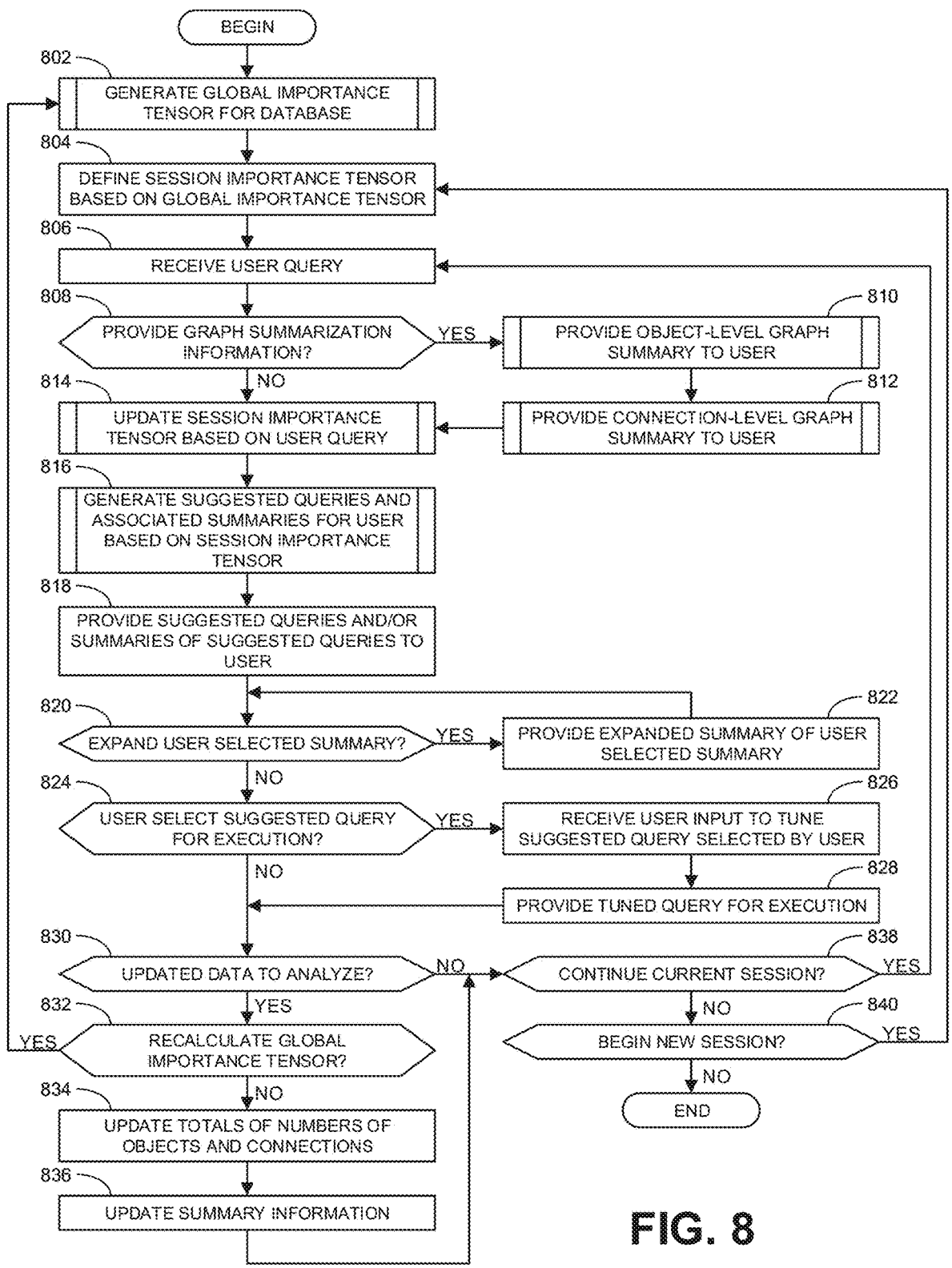
FIGS. 8-13 are flowcharts representative of machine readable instructions which may be executed to implement the example database query system of FIGS. 1 and/or 3.

The program of FIG. 8 begins at block 802 where the example importance tensor generator 308 generates a global importance tensor for a database. Further detail regarding the implementation of block 802 is provided below in connection with FIG. 9. At block 804, the example importance adaptation analyzer 314 defines a session importance tensor based on the global importance tensor. At block 806, the example user interface 310 receives a user query. At block 808, the example database query system 100 determines whether to provide graph summarization information. In some examples, the system 100 may determine to provide the graph summarization information based on a user request. In some examples, the system 100 may automatically provide the graph summarization information whenever a user begins a new query session. In some examples, the system 100 may determine to provide the graph summarization information in response to updates to the data in the underlying database. If graph summarization information is to be provided, control advances to block 810, where the example object-level summary generator 320 provides an object-level graph summary to the user. Further detail regarding the implementation of block 810 is provided below in connection with FIG. 10. At block 812, the example connection-level summary generator 322 provides a connection-level graph summary to the user. Further detail regarding the implementation of block 812 is provided below in connection with FIG. 11. Thereafter, control advances to block 814. Returning to block 808, if the example database query system 100 determines not to provide graph summarization information, control advances directly to block 814.

At block 814, the example importance adaptation analyzer 314 updates the session importance tensor based on the user query. Further detail regarding the implementation of block 814 is provided below in connection with FIG. 12. At block 816, the example query generator 316, in conjunction with the example query summary generator 318, generates suggested queries and associated summaries for the user based on the session importance tensor. Further detail regarding the implementation of block 816 is provided below in connection with FIG. 13. At block 818, the example user interface 310 provides the suggested queries and/or summaries of the suggest queries to the user. At block 820, the example query summary generator 318 determines whether to expand a user selected summary. In some examples, expanding a summary is based on user input (received via the example user interface 310 request the expansion). If a summary is to be expanded, control advances to block 822 where the example user interface 310 provides an expanded summary of the user selected summary. In some examples, the expanded summary is generated by the query summary generator 318. Thereafter, control returns to block 820 to determine whether to expand the summary further.

If the example query summary generator 318 determines not to expand any summaries (block 820), control advances to block 824 where the example user interface 310 determines whether the user selected a suggested query for execution. If so, control advances to block 826 where the example user interface 310 receives user input to tune the suggested query selected by the user. In some examples, the user may modify or tune the suggested query to more closely align with the interests of the user. In some examples, the user may modify or tune the suggested query based on insights obtained from the graph summarization information provided at blocks 810, 812. In some examples, the user may choose to accept the selected query without alteration. Thereafter, at block 828, the example user interface 310 provides the tuned query to the user for execution and the control advances to block 830. If the example user interface 310 determines the user has not selected a suggested query for execution, control advances directly to block 830.

At block 830, the example knowledge graph generator 304 determines whether there is updated data to analyze. If so, control advances to block 832 where the example importance tensor generator 308 determines whether to recalculate the global importance tensor. If so, control returns to block 802 to regenerate the global importance tensor. If the example importance tensor generator 308 determines not to recalculate the global importance tensor (block 832), control advances to block 834 where the example knowledge graph generator updates totals of numbers of objects and connections. In some examples, this updated information is stored until such time that the full global importance tensor is recalculated. At block 836, the example object-level summary generator 320 and/or the example connection-level summary generator 322 update the summary information. Thereafter, control advances to block 838. Returning to block 830, if the example knowledge graph generator 304 determines there is no updated data to analyze, control advances directly to block 838.

At block 838, the example database query system 100 determines whether to continue the current session. If so, control returns to block 806 where another user query may be received. In some examples, this subsequent user query may correspond to the suggested query selected and tuned by the user at blocks 824, 826, and 828. Alternatively, if the user did not select a suggested query, the subsequent query may be a different query generated by the user (which may or may not have been developed by the user based the graph summarization information provided at blocks 810 and 812). If, at block 838, the example database query system 100 determines not to continue the current session, control advances to block 840 where the example database query system 100 determines whether to begin a new session. If so, control returns to block 804 to define a new session importance tensor. Otherwise, the example program of FIG. 8 ends.

Figure 9:
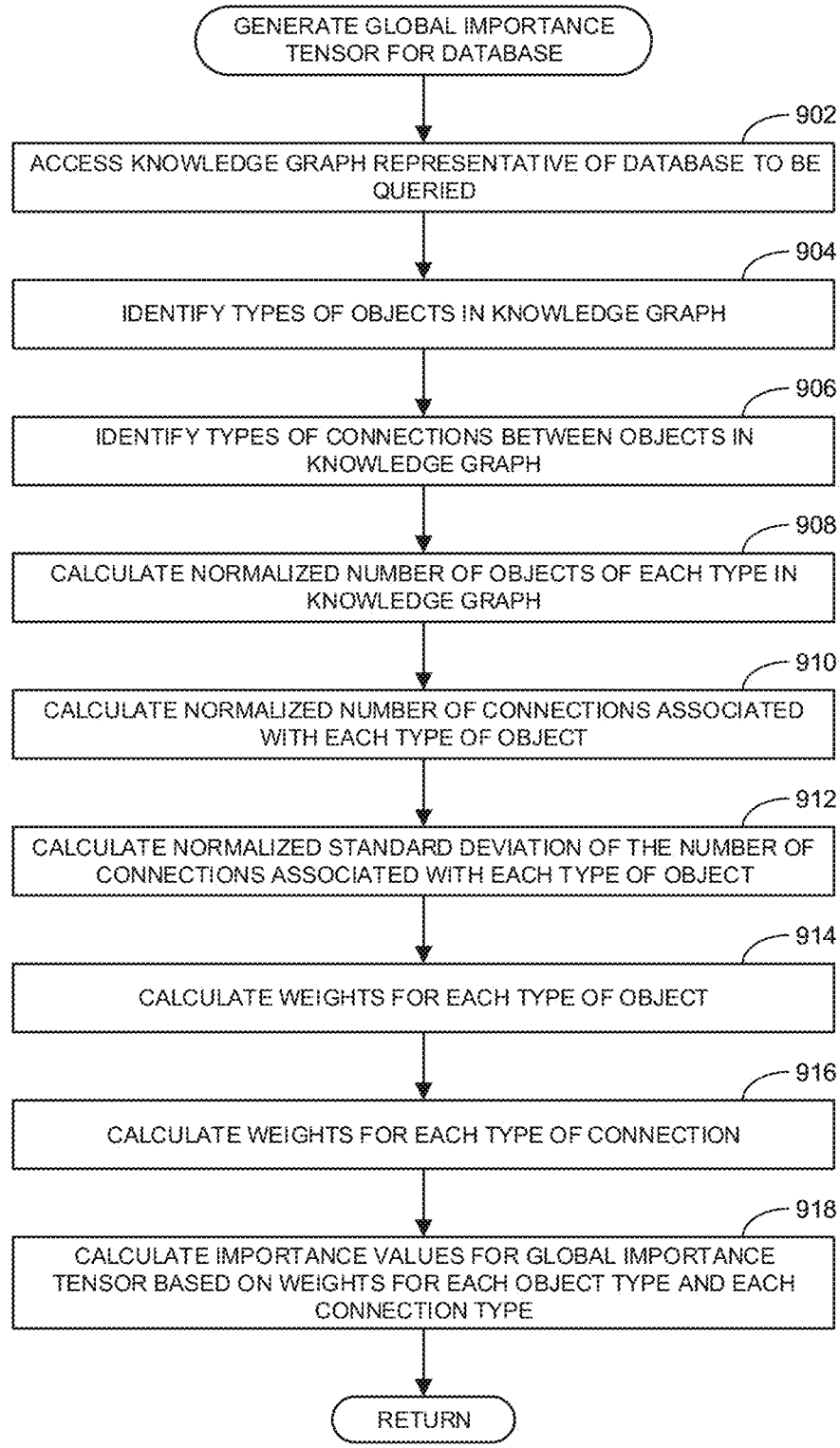

FIG. 9 is an example implementation of block 802 of FIG. 8. The example process of FIG. 9 begins at block 902 where the example importance tensor generator 308 accesses a knowledge graph representative of the database to be queried. In some examples, the knowledge graph may be generated by the example knowledge graph generator 304. In other examples, the knowledge graph may be generated independent of the database query system 100 and accessed via the example communications interface 306. At block 904, the example importance tensor generator 308 identifies types of objects in the knowledge graph. At block 906, the example importance tensor generator 308 identifies types of connections between the objects in the knowledge graph. At block 908, the example importance tensor generator 308 calculates a normalized number of objects of each type in the knowledge graph. In some examples, this calculation is based on Equation 1 described above. At block 910, the example importance tensor generator 308 calculates a normalized number of connections associated with each type of object. In some examples, the calculation is based on Equations 3 and 4 described above. At block 912, the example importance tensor generator 308 calculates a normalized standard deviation of the number of connections associated with each type of object. In some examples, this calculation is based on Equations 5 and 6 described above.

At block 914, the example importance tensor generator 308 calculates weights for each type of object. In some examples, this calculation is based on the results of the calculations of block 908, 910, and 912 and Equation 7 described above. At block 916, the example importance tensor generator 308 calculates weights for each type of connection. In some examples, this calculation is based on Equation 2 described above. At block 918, the example importance tensor generator 308 calculates importance values for global importance tensor based on weights for each object type and each connection type. In some examples, this calculation is based on Equation 8 described above. Thereafter, the example process of FIG. 9 ends and returns to complete the process of FIG. 8.

Figure 10:
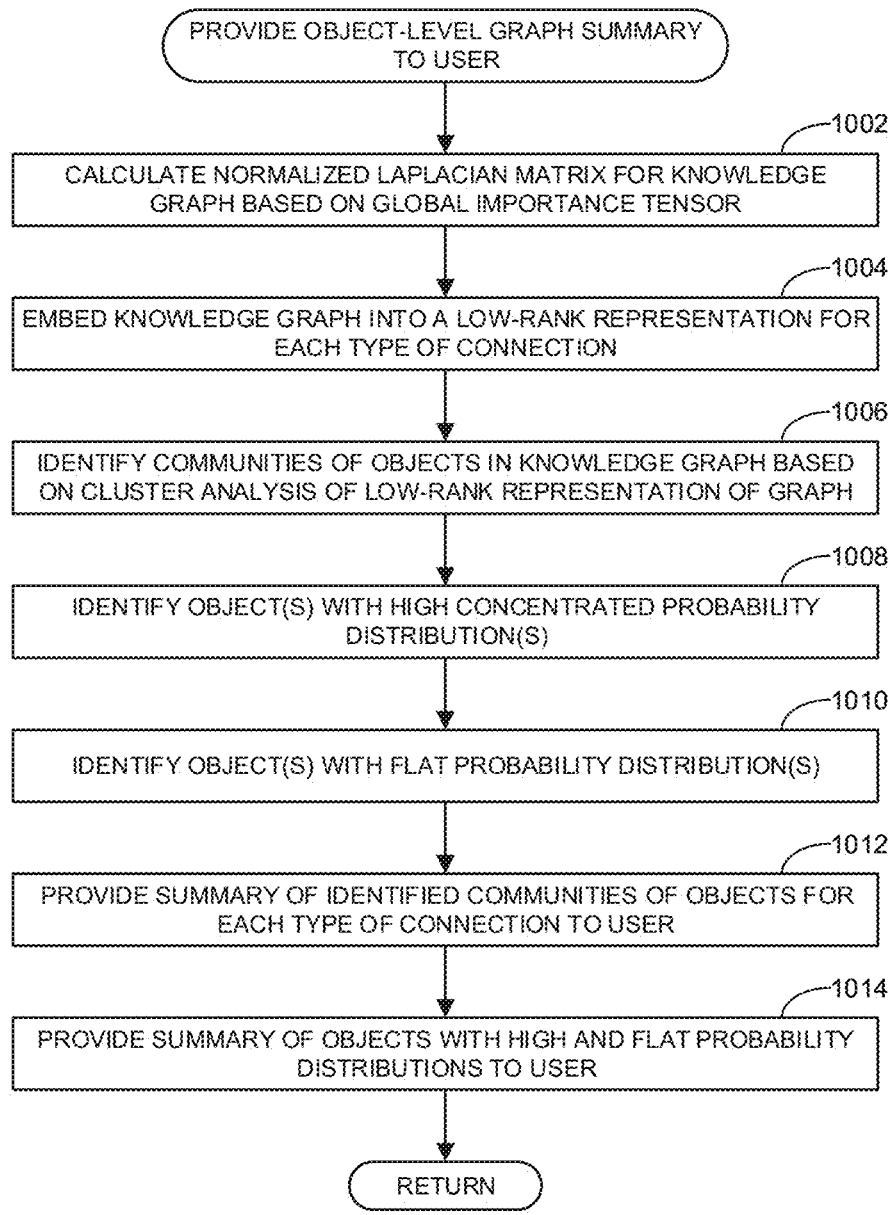

FIG. 10 is an example implementation of block 810 of FIG. 8. The example process of FIG. 10 begins at block 1002 where the example object-level summary generator 320 calculates a normalized Laplacian matrix for the knowledge graph based on the global importance tensor. In some examples, this calculation is base on Equations 14 and 15 described above. At block 1004, the example object-level summary generator 320 embeds the knowledge graph into a low-rank representation for each type of connection. In some examples, this process is based on a numerical analysis of Equation 16 to arrive at the low-rank representation of Equation 17. At block 1006, the example object-level summary generator 320 identifies communities of objects in the knowledge graph based on cluster analysis of the low-rank representation of the graph.

At block 1008, the example object-level summary generator 320 identifies object(s) with high concentrated probability distribution(s). In some examples, a high concentrated probability distribution is defined relative to a threshold value. At block 1010, the example object-level summary generator 320 identifies object(s) with flat probability distribution(s). In some examples, a flat probability distribution is defined relative to another threshold value. At block 1012, the example user interface 310 provides a summary of the identified communities of objects for each type of connection to the user. At block 1014, the example user interface 310 provides a summary of the objects with high and flat probability distributions to the user. Thereafter, the example process of FIG. 10 ends and returns to complete the process of FIG. 8.

Figure 11:
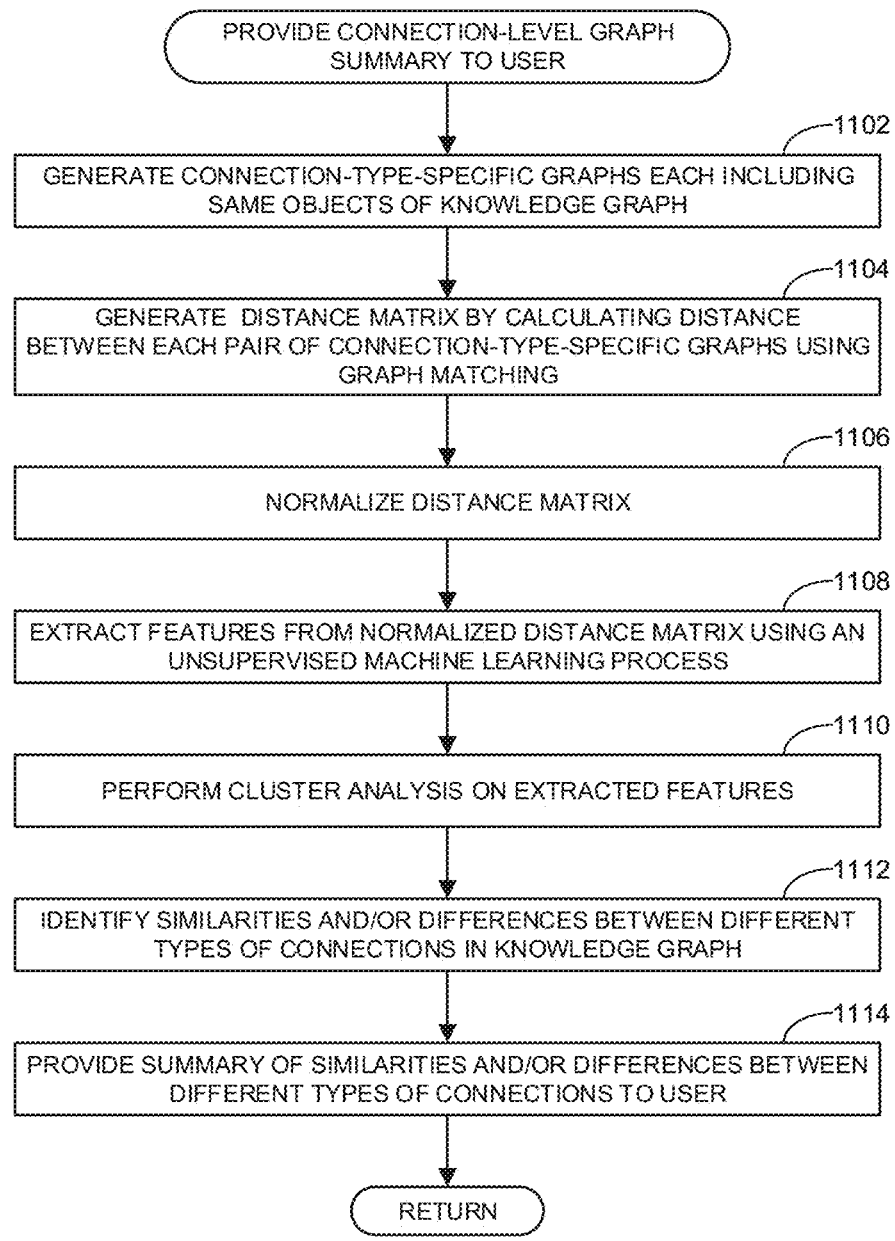

FIG. 11 is an example implementation of block 812 of FIG. 8. The example process of FIG. 11 begins at block 1102 where the example connection-level summary generator 322 generates connection-type-specific graphs each including the same objects of the knowledge graph. At block 1104, the example connection-level summary generator 322 generates a distance matrix by calculating the distance between each pair of connection-type-specific graphs using graph matching. At block 1106, the example connection-level summary generator 322 normalizes the distance matrix. At block 1108, the example connection-level summary generator 322 extracts features from the normalized distance matrix using an unsupervised machine learning process. In some examples, the machine learning process involves a DNN such as a sparse autoencoder as described above in connection with FIG. 7. At block 1110, the example connection-level summary generator 322 performs cluster analysis on the extracted features. At block 1112, the example connection-level summary generator 322 identifies similarities and/or differences between different types of connections in the knowledge graph. At block 1114, the example user interface 310 provides a summary of the similarities and/or differences between the different types of connections to the user. Thereafter, the example process of FIG. 11 ends and returns to complete the process of FIG. 8.

Figure 12:
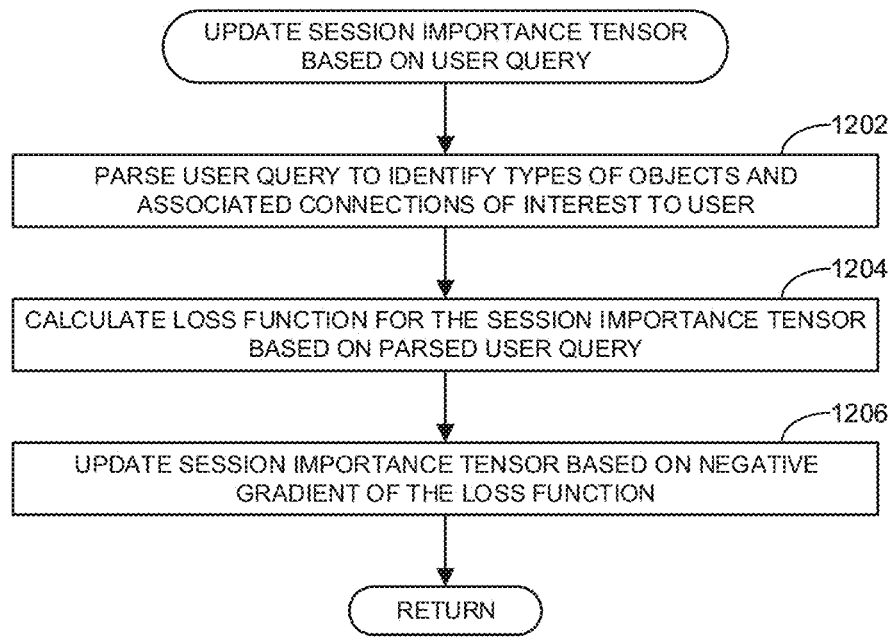

FIG. 12 is an example implementation of block 814 of FIG. 8. The example process of FIG. 12 begins at block 1202 where the example query language analyzer 312 parses the user query to identify types of objects and associated connections of interest to the user. At block 1204, the example importance adaptation analyzer 314 calculates the loss function for the session importance tensor based on the parsed user query. In some examples, this calculation is based on Equation 10 described above. At block 1206, the example importance adaptation analyzer 314 updates the session importance tensor based on the negative gradient of the loss function. In some examples, this calculation is based on Equation 11 described above. Thereafter, the example process of FIG. 12 ends and returns to complete the process of FIG. 8.

Figure 13:
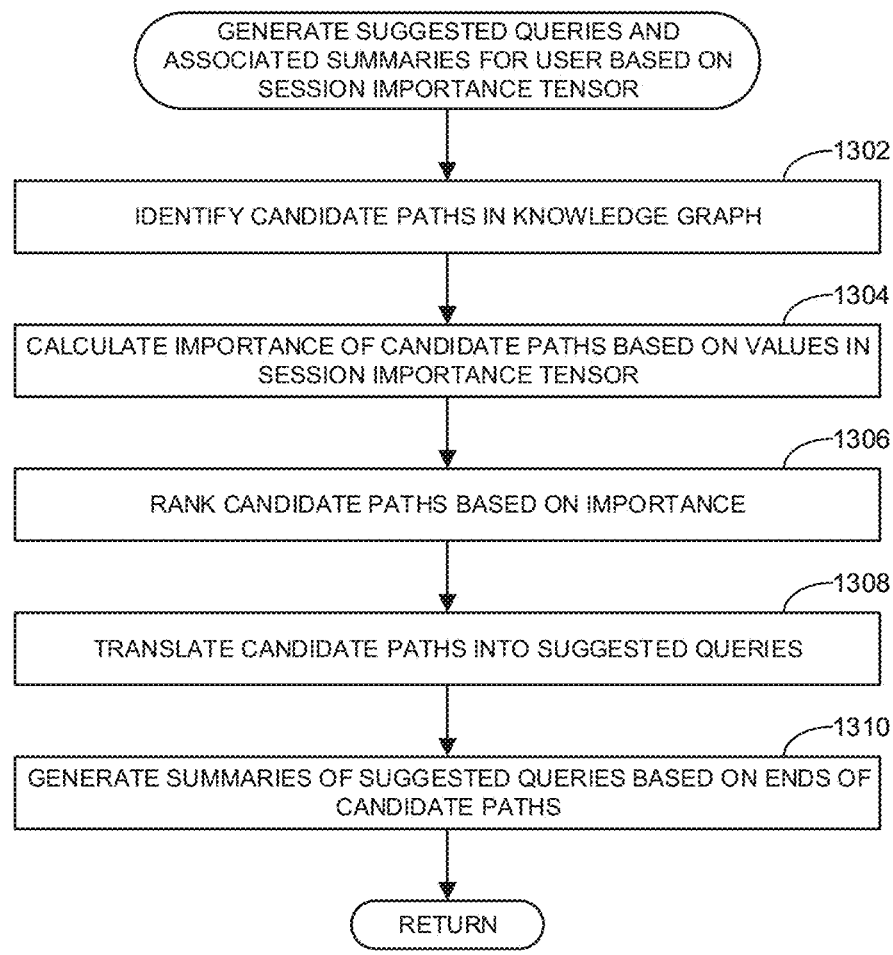

FIG. 13 is an example implementation of block 816 of FIG. 8. The example process of FIG. 13 begins at block 1302 where the example query generator 316 identifies candidate paths in the knowledge graph. In some examples, the beginning point of the candidate paths is selected as corresponding to an object identify in the user query. In some examples, the query generator 316 identifies candidate paths in a random manner. In some examples, the query generator 316 identifies the candidate paths based on particular path generation criteria (e.g., a highest importance criterion, a lowest importance criterion, etc.). At block 1304, the example query generator 316 calculates an importance of the candidate paths based on importance values in the session importance tensor. In some examples, this calculation is based on Equation 13 described above. At block 1306, the example query generator 316 ranks the candidate paths based on the importance. In some examples, the ranking of the candidate paths are used to select which candidate paths are used as the basis to define a suggested query. At block 1308, the example query generator 316 translates candidate paths into suggested queries. In some examples, the suggested queries are structured in a format corresponding to a query language for the database. At block 1310, the example query summary generator 318 generates summaries of suggested queries based on ends of the candidate paths. Thereafter, the example process of FIG. 13 ends and returns to complete the process of FIG. 8.

Figure 14:
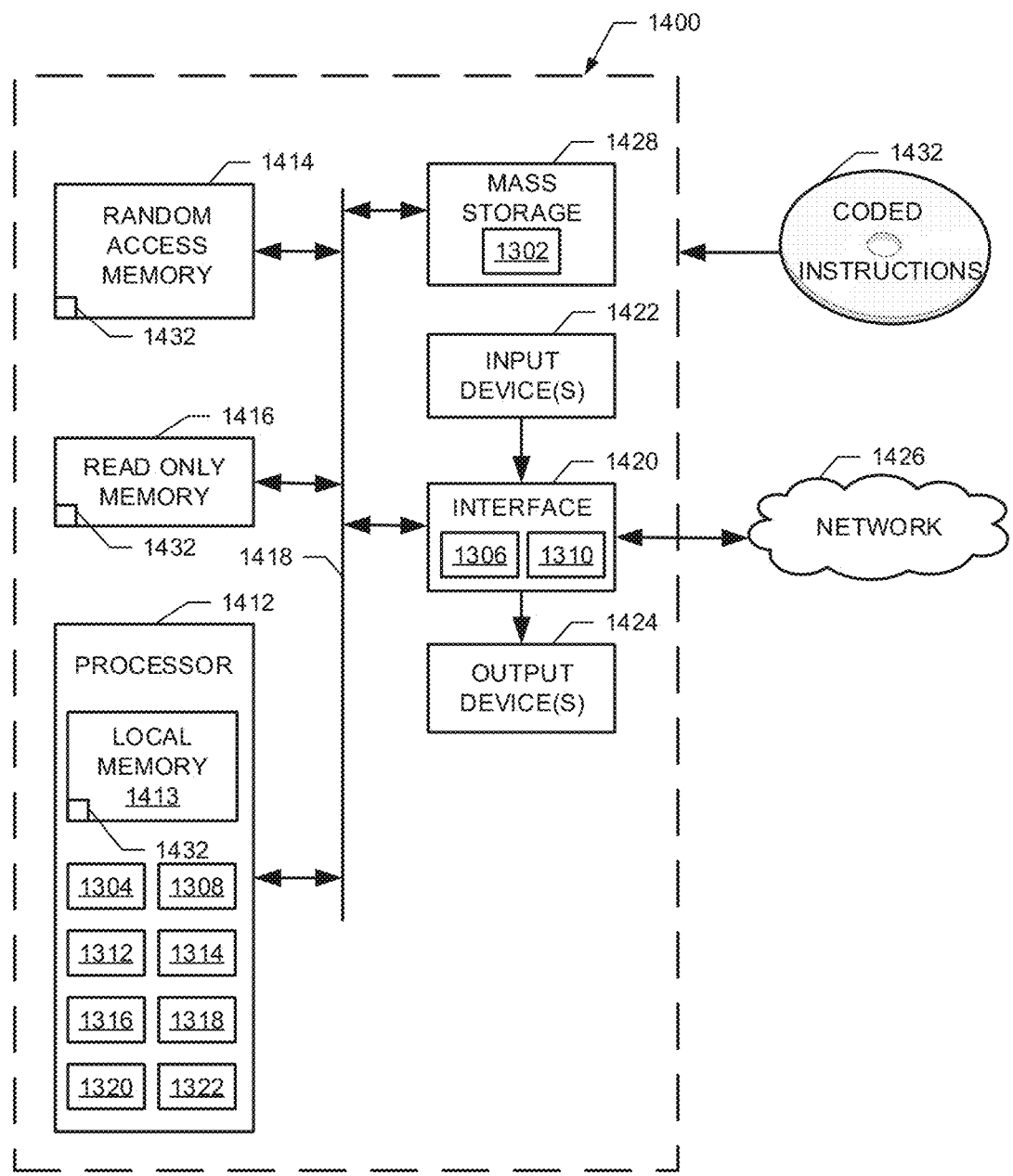
FIG. 14 is a block diagram of an example processing platform structured to execute the instructions of FIGS. 8-13 to implement the example database query system of FIGS. 1 and/or 3

FIG. 14 is a block diagram of an example processor platform 1400 structured to execute the instructions of FIGS. 8-13 to implement the example database query system 100 of FIGS. 1 and/or 3. The processor platform 1400 can be, for example, a server, a personal computer, a workstation, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example knowledge graph generator 304, the example importance tensor generator 308, the example query language analyzer 312, the an example importance adaptation analyzer 314, the example query generator 316, the example query summary generator 318, the example object-level summary generator 320, and the example connection-level summary generator 322.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface. In this example, the interface circuit 1420 implements the example communications interface 306, and the example user interface 310.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives. In this example, the mass storage device implements the example memory 302.

The machine executable instructions 1432 of FIGS. 8-13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that enable the automatic generation of complex queries that may be provided to a user for implementation to extract hidden and/or meaningful insights from a database that the user may not have been able to develop unassisted due to a human's limited ability to fully comprehend all the complexities in a large database of highly connected information. In some examples, the suggested queries are based on importance values of inherent characteristics of the data in the database associated with the distribution of object types and associated connection types in a knowledge graph. These importance values are stored in an importance tensor that is a separate data structure to the representation of the database. As such, examples disclosed herein are agnostic to the nature of the underlying database making examples disclosed herein more flexible than many existing solutions for database query generation. Furthermore, in some examples, the importance values for the objects and connections are constantly updated and/or adapted to the interests of a user based on contextual information obtained from an analysis of queries the user has already performed on the database during a particular query session. Therefore, the suggested queries not only enable users to uncover meaningful insights that may have otherwise remained hidden but also uncover insights that are directly focused on the interests of the user.

Example methods, apparatus, systems, and articles of manufacture to facilitate generation of database queries are disclosed herein. Further examples and combinations thereof include the following:

Example 1 includes an apparatus comprising a generator to generate a global importance tensor, the global importance tensor based on a knowledge graph representative of information stored in a database, the knowledge graph including objects and connections between the objects, the global importance tensor including importance values for different types of the connections between the objects, an importance adaptation analyzer to generate a session importance tensor based on the global importance tensor and a user query, and a user interface to provide a suggested query to a user based on the session importance tensor.

Example 2 includes the apparatus of example 1, wherein the importance values in the global importance tensor are based on at least one of a number of each different type of object in the knowledge graph, a number of each different type of connection in the knowledge graph, an average number of the connections associated with each different type of object, or a standard deviation of a number of the connections associated with ones of the objects corresponding to each different type of object.

Example 3 includes the apparatus of any one of examples 1 or 2, wherein the importance tensor generator is to calculate a first weight for a first one of the objects, calculate a second weight for a second one of the objects, calculate a third weight for a first one of the connections between the first and second objects, and calculate a first one of the importance values in the global importance tensor by multiplying the first, second, and third weights.

Example 4 includes the apparatus of example 3, wherein the first object corresponds to a first object type, the importance tensor generator to calculate the first weight by calculating a first number of the objects in the knowledge graph corresponding to the first object type, calculating an average number of the connections associated with each of the objects in the knowledge graph corresponding to the first object type, and calculating a standard deviation of a number of the connections associated with each of the objects corresponding to the first object type.

Example 5 includes the apparatus of example 4, wherein the importance tensor generator is to calculate the first weight by normalizing the first number relative to a total number of the objects in the knowledge graph, and normalizing the average number relative to numbers of connections associated with individual ones of the objects corresponding to the first object type, and normalizing the standard deviation relative to standard deviations of numbers of the connections associated with ones of the objects corresponding to other types of objects different than the first object type.

Example 6 includes the apparatus of any one of examples 3-5, wherein the first connection corresponds to a first connection type, the importance tensor generator to calculate the third weight by calculating a number of the connections in the knowledge graph corresponding to the first connection type, and normalizing the number relative to a total number of the connections in the knowledge graph.

Example 7 includes the apparatus of any one of examples 1-6, wherein the user query is a first user query and the suggested query is a first suggested query, the importance adaptation analyzer to modify the session importance tensor based on a second user query, the user interface to provide a second suggested query to the user based on the modified session importance tensor.

Example 8 includes the apparatus of any one of examples 1-7, wherein the importance adaptation analyzer is to generate the session importance tensor by defining the session importance tensor as corresponding to the global importance tensor, calculating a loss function for the session importance tensor based on ones of the objects and associated ones of the connections identified in the user query, and updating the session importance tensor by the negative gradient of the loss function.

Example 9 includes the apparatus of any one of examples 1-8, further including a query generator to determine a first path in the knowledge graph, the first path defined by a first series of connections including one or more of the connections, calculate a first importance of the first path by multiplying the importance values associated with the connections in the first series of connections, determine a second path in the knowledge graph, the second path defined by a second series of connections including one or more of the connections, calculate a second importance of the second path by multiplying the importance values associated with the connections in the second series of connections, rank the first path and second path based on the first importance and the second importance, and select one of the first path or the second path as a basis for the suggested query based on the ranking.

Example 10 includes the apparatus of any one of examples 1-8, further including a query generator to identify a first object of the objects as a beginning of a path within the knowledge graph, define hops in the path corresponding to the connections from the first object to a second one of the objects at an ending of the path, the connections associated with one or more intermediate ones of the objects between the first and second objects along the path, and generate the suggested query based on the path.

Example 11 includes the apparatus of example 10, wherein the query generator is to identify subsequent ones of the one or more intermediate objects in the path based on the importance values corresponding to the connections associated with an immediately preceding object in the path.

Example 12 includes the apparatus of any one of examples 10 or 11, wherein the query generator is to compare the importance values corresponding to different ones of the connections associated with the first object, select a first connection of the different ones of the connections associated with the first object as a first hop in the path based on the comparison, and identify subsequent hops in the path based on subsequent comparisons of the importance values corresponding to different ones of the connections associated with ones of the objects at an end of preceding hops in the path.

Example 13 includes the apparatus of example 12, wherein the first connection associated with the first object is associated with a higher importance value than other ones of the different ones of the connections associated with the first object.

Example 14 includes the apparatus of example 13, wherein the first connection associated with the first object is associated with a lower importance value than other ones of the different ones of the connections associated with the first object.

Example 15 includes the apparatus of any one of examples 10-14, wherein the query generator is to translate the objects and the connections along the path into a structured format corresponding to a syntax of a query language associated with the database, the suggested query provided to the user including the structured format.

Example 16 includes the apparatus of example 15, further including a query summary generator to generate a summary of the suggested query to the user that is not based on the syntax of the query language, the summary identifying the first and second objects in the path and at least one of a first one of the hops or a first one of the intermediate objects, the user interface to provide the summary to the user.

Example 17 includes the apparatus of example 16, wherein the query summary generator is to generate, in response to a user request to expand the summary, an expanded summary of the suggested query, the expanded summary including at least one of a second one of the hops or a second one of the intermediate objects.

Example 18 includes the apparatus of any one of examples 1-17, further including an object-level summary generator to generate an object-level graph summarization of the knowledge graph, the object-level graph summarization indicative of clusters of the objects for each type of the connections, the user to provide the object-level graph summarization to the user.

Example 19 includes the apparatus of example 18, wherein the object-level summary generator is to generate a low-rank representation of the knowledge graph based on Laplacian embedding of each type of connection, and implement a cluster analysis on the low-rank representation to identify the clusters for the object-level graph summarization.

Example 20 includes the apparatus of any one of examples 1-19, further including a connection-level summary generator to generate a connection-level graph summarization of the knowledge graph, the connection-level graph summarization indicative of at least one of similarities or dissimilarities between different types of the connections across the objects in the knowledge graph, the user to provide the connection-level graph summarization to the user.

Example 21 includes the apparatus of example 20, wherein the connection-level summary generator is to define connection-type-specific graphs corresponding to ones of the connection in the knowledge graph corresponding to particular types of the connections, determine distances between different pairs of the connection-type-specific graphs based on graph matching, identify features within a distance matrix using a sparse autoencoder, the distance matrix containing the distances between the different pairs of the connection-type-specific graphs, and implement a cluster analysis on the identified features to identify the at least one of the similarities or the dissimilarities between the different types of the connections.

Example 22 includes a non-transitory computer readable medium comprising instructions that, when executed, cause a machine to at least generate a global importance tensor, the global importance tensor based on a knowledge graph representative of information stored in a database, the knowledge graph including objects and connections between the objects, the global importance tensor including importance values for different types of the connections between the objects, generate a session importance tensor based on the global importance tensor and a user query, and provide a suggested query to a user based on the session importance tensor.

Example 23 includes the non-transitory computer readable medium of example 22, wherein the importance values in the global importance tensor are based on at least one of a number of each different type of object in the knowledge graph, a number of each different type of connection in the knowledge graph, an average number of the connections associated with each different type of object, or a standard deviation of a number of the connections associated with ones of the objects corresponding to each different type of object.

Example 24 includes the non-transitory computer readable medium of any one of examples 22 or 23, wherein the instructions further cause the machine to calculate a first weight for a first one of the objects, calculate a second weight for a second one of the objects, calculate a third weight for a first one of the connections between the first and second objects, and calculate a first one of the importance values in the global importance tensor by multiplying the first, second, and third weights.

Example 25 includes the non-transitory computer readable medium of example 24, wherein the first object corresponds to a first object type, the instructions to further cause the machine to calculate a first number of the objects in the knowledge graph corresponding to the first object type, calculate an average number of the connections associated with each of the objects in the knowledge graph corresponding to the first object type, and calculate a standard deviation of a number of the connections associated with each of the objects corresponding to the first object type.

Example 26 includes the non-transitory computer readable medium of example 25, wherein the instructions further cause the machine to normalize the first number relative to a total number of the objects in the knowledge graph, and normalize the average number relative to numbers of connections associated with individual ones of the objects corresponding to the first object type, and normalize the standard deviation relative to standard deviations of numbers of the connections associated with ones of the objects corresponding to other types of objects different than the first object type.

Example 27 includes the non-transitory computer readable medium of any one of examples 24 or 25, wherein the first connection corresponds to a first connection type, the instructions to further cause the machine to calculate a number of the connections in the knowledge graph corresponding to the first connection type, and normalize the number relative to a total number of the connections in the knowledge graph.

Example 28 includes the non-transitory computer readable medium of any one of examples 22-27, wherein the user query is a first user query and the suggested query is a first suggested query, the instructions to further cause the machine to modify the session importance tensor based on a second user query, and provide a second suggested query to the user based on the modified session importance tensor.

Example 29 includes the non-transitory computer readable medium of any one of examples 22-28, wherein the instructions further cause the machine to define the session importance tensor as corresponding to the global importance tensor, calculate a loss function for the session importance tensor based on ones of the objects and associated ones of the connections identified in the user query, and update the session importance tensor by the negative gradient of the loss function.

Example 30 includes the non-transitory computer readable medium of any one of examples 22-29, wherein the instructions further cause the machine to determine a first path in the knowledge graph, the first path defined by a first series of connections including one or more of the connections, calculate a first importance of the first path by multiplying the importance values associated with the connections in the first series of connections, determine a second path in the knowledge graph, the second path defined by a second series of connections including one or more of the connections, calculate a second importance of the second path by multiplying the importance values associated with the connections in the second series of connections, rank the first path and second path based on the first importance and the second importance, and select one of the first path or the second path as a basis for the suggested query based on the ranking.

Example 31 includes the non-transitory computer readable medium of any one of examples 22-29, wherein the instructions further cause the machine to identify a first object of the objects as a beginning of a path within the knowledge graph, define hops in the path corresponding to the connections extending from the first object to a second one of the objects at an ending of the path, the connections associated with one or more intermediate ones of the objects between the first and second objects along the path, and generate the suggested query based on the path.

Example 32 includes the non-transitory computer readable medium of example 31, wherein the instructions further cause the machine to identify subsequent ones of the one or more intermediate objects in the path based on the importance values corresponding to the connections associated with an immediately preceding object in the path.

Example 33 includes the non-transitory computer readable medium of any one of examples 31 or 32, wherein the instructions further cause the machine to compare the importance values corresponding to different ones of the connections associated with the first object, select a first connection of the different ones of the connections associated with the first object as a first hop in the path based on the comparison, and identify subsequent hops in the path based on subsequent comparisons of the importance values corresponding to different ones of the connections associated with ones of the objects at an end of preceding hops in the path.

Example 34 includes the non-transitory computer readable medium of example 33, wherein the first connection associated with the first object is the first hop when the first connection is associated with a higher importance value than other ones of the different ones of the connections associated with the first object.

Example 35 includes the non-transitory computer readable medium of example 34, wherein the first connection associated with the first object is the first hop when the first connection is associated with a lower importance value than other ones of the different ones of the connections associated with the first object.

Example 36 includes the non-transitory computer readable medium of any one of examples 31-35, wherein the instructions further cause the machine to translate the objects and the connections along the path into a structured format corresponding to a syntax of a query language associated with the database, the suggested query provided to the user including the structured format.

Example 37 includes the non-transitory computer readable medium of example 36, wherein the instructions further cause the machine to generate a summary of the suggested query to the user that is not based on the syntax of the query language, the summary identifying the first and second objects in the path and at least one of a first one of the hops or a first one of the intermediate objects, and provide the summary to the user.

Example 38 includes the non-transitory computer readable medium of example 37, wherein the instructions further cause the machine to, in response to a user request to expand the summary, providing an expanded summary of the suggested query, the expanded summary including at least one of a second one of the hops or a second one of the intermediate objects.

Example 39 includes the non-transitory computer readable medium of any one of examples 22-38, wherein the instructions further cause the machine to provide an object-level graph summarization of the knowledge graph, the object-level graph summarization indicative of clusters of the objects for each type of the connections.

Example 40 includes the non-transitory computer readable medium of example 39, wherein the instructions further cause the machine to generate a low-rank representation of the knowledge graph based on Laplacian embedding of each type of connection, and implement a cluster analysis on the low-rank representation to identify the clusters for the object-level graph summarization.

Example 41 includes the non-transitory computer readable medium of any one of examples 22-40, wherein the instructions further cause the machine to provide a connection-level graph summarization of the knowledge graph, the connection-level graph summarization indicative of at least one of similarities or dissimilarities between different types of the connections across the objects in the knowledge graph.

Example 42 includes the non-transitory computer readable medium of example 41, wherein the instructions further cause the machine to define connection-type-specific graphs corresponding to ones of the connection in the knowledge graph corresponding to particular types of the connections, determine distances between different pairs of the connection-type-specific graphs based on graph matching, identify features within a distance matrix using a sparse autoencoder, the distance matrix containing the distances between the different pairs of the connection-type-specific graphs, and implement a cluster analysis on the identified features to identify the at least one of the similarities or the dissimilarities between the different types of the connections.

Example 43 includes a method comprising generating, by executing an instruction with at least one processor, a global importance tensor, the global importance tensor based on a knowledge graph representative of information stored in a database, the knowledge graph including objects and connections between the objects, the global importance tensor including importance values for different types of the connections between the objects, generating, by executing an instruction with the at least one processor, a session importance tensor based on the global importance tensor and a user query, and providing, by executing an instruction with the at least one processor, a suggested query to a user based on the session importance tensor.

Example 44 includes the method of example 43, wherein the importance values in the global importance tensor are based on at least one of a number of each different type of object in the knowledge graph, a number of each different type of connection in the knowledge graph, an average number of the connections associated with each different type of object, or a standard deviation of a number of the connections associated with ones of the objects corresponding to each different type of object.

Example 45 includes the method of any one of examples 43 or 44, further including calculating a first weight for a first one of the objects, calculating a second weight for a second one of the objects, calculating a third weight for a first one of the connections between the first and second objects, and calculating a first one of the importance values in the global importance tensor by multiplying the first, second, and third weights.

Example 46 includes the method of example 45, wherein the first object corresponds to a first object type, the calculation of the first weight including calculating a first number of the objects in the knowledge graph corresponding to the first object type, calculating an average number of the connections associated with each of the objects in the knowledge graph corresponding to the first object type, and calculating a standard deviation of a number of the connections associated with each of the objects corresponding to the first object type.

Example 47 includes the method of example 46, wherein the calculation of the first weight includes normalizing the first number relative to a total number of the objects in the knowledge graph, and normalizing the average number relative to numbers of connections associated with individual ones of the objects corresponding to the first object type, and normalizing the standard deviation relative to standard deviations of numbers of the connections associated with ones of the objects corresponding to other types of objects different than the first object type.

Example 48 includes the method of any one of examples 45-47, wherein the first connection corresponds to a first connection type, the calculation of the third weight including calculating a number of the connections in the knowledge graph corresponding to the first connection type, and normalizing the number relative to a total number of the connections in the knowledge graph.

Example 49 includes the method of any one of examples 43-48, wherein the user query is a first user query and the suggested query is a first suggested query, further including modifying the session importance tensor based on s second user query, and providing a second suggested query to the user based on the modified session importance tensor.

Example 50 includes the method of ex any one of examples ample 43-49, wherein the generation of the session importance tensor includes defining the session importance tensor as corresponding to the global importance tensor, calculating a loss function for the session importance tensor based on ones of the objects and associated ones of the connections identified in the user query, and updating the session importance tensor by the negative gradient of the loss function.

Example 51 includes the method of any one of examples 43-50, further including determining a first path in the knowledge graph, the first path defined by a first series of connections including one or more of the connections, calculating a first importance of the first path by multiplying the importance values associated with the connections in the first series of connections, determining a second path in the knowledge graph, the second path defined by a second series of connections including one or more of the connections, calculating a second importance of the second path by multiplying the importance values associated with the connections in the second series of connections, ranking the first path and second path based on the first importance and the second importance, and selecting one of the first path or the second path as a basis for the suggested query based on the ranking.

Example 52 includes the method of any one of examples 43-50, further including identifying a first object of the objects as a beginning of a path within the knowledge graph, defining hops in the path corresponding to a series of the connections extending from the first object to a second one of the objects at an ending of the path, the series of connections associated with one or more intermediate ones of the objects between the first and second objects along the path, and generating the suggested query based on the path.

Example 53 includes the method of example 52, further including identifying subsequent ones of the one or more intermediate objects in the path based on the importance values corresponding to the connections associated with an immediately preceding object in the path.

Example 54 includes the method of any one of examples 52 or 53, further including comparing the importance values corresponding to different ones of the connections associated with the first object, selecting a first connection of the different ones of the connections associated with the first object as a first hop in the path based on the comparison, and identifying subsequent hops in the path based on subsequent comparisons of the importance values corresponding to different ones of the connections associated with ones of the objects at an end of preceding hops in the path.

Example 55 includes the method of example 54, wherein the first connection associated with the first object is associated with a higher importance value than other ones of the different ones of the connections associated with the first object.

Example 56 includes the method of example 55, wherein the first connection associated with the first object is associated with a lower importance value than other ones of the different ones of the connections associated with the first object.

Example 57 includes the method of any one of examples 52-56, further including translating the objects and the connections along the path into a structured format corresponding to a syntax of a query language associated with the database, the suggested query provided to the user including the structured format.

Example 58 includes the method of example 57, further including generating a summary of the suggested query to the user that is not based on the syntax of the query language, the summary identifying the first and second objects in the path and at least one of a first one of the hops or a first one of the intermediate objects, and providing the summary to the user.

Example 59 includes the method of example 58, further including, in response to a user request to expand the summary, providing an expanded summary of the suggested query, the expanded summary including at least one of a second one of the hops or a second one of the intermediate objects.

Example 60 includes the method of any one of examples 43-59, further including providing an object-level graph summarization of the knowledge graph, the object-level graph summarization indicative of clusters of the objects for each type of the connections.

Example 61 includes the method of example 60, further including generating a low-rank representation of the knowledge graph based on Laplacian embedding of each type of connection, and implementing a cluster analysis on the low-rank representation to identify the clusters for the object-level graph summarization.

Example 62 includes the method of any one of examples 43-61, further including providing a connection-level graph summarization of the knowledge graph, the connection-level graph summarization indicative of at least one of similarities or dissimilarities between different types of the connections across the objects in the knowledge graph.

Example 63 includes the method of example 62, further including defining connection-type-specific graphs corresponding to ones of the connection in the knowledge graph corresponding to particular types of the connections, determining distances between different pairs of the connection-type-specific graphs based on graph matching, identifying features within a distance matrix using a sparse autoencoder, the distance matrix containing the distances between the different pairs of the connection-type-specific graphs, and implementing a cluster analysis on the identified features to identify the at least one of the similarities or the dissimilarities between the different types of the connections.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    an importance tensor generator to generate a global importance tensor, the global importance tensor based on a knowledge graph representative of information stored in a database, the knowledge graph including objects and connections between the objects, the global importance tensor including importance values for different types of the connections between the objects;
    an importance adaptation analyzer to generate a session importance tensor based on the global importance tensor and a user query; and
    a user interface to provide a suggested query to a user based on the session importance tensor.

2. The apparatus of claim 1, wherein the importance values in the global importance tensor are based on at least one of a number of each different type of object in the knowledge graph, a number of each different type of connection in the knowledge graph, an average number of the connections associated with each different type of object, or a standard deviation of a number of the connections associated with ones of the objects corresponding to each different type of object.

3. The apparatus of claim 1, wherein the importance tensor generator is to:
    calculate a first weight for a first one of the objects;
    calculate a second weight for a second one of the objects;
    calculate a third weight for a first one of the connections between the first and second objects; and
    calculate a first one of the importance values in the global importance tensor by multiplying the first, second, and third weights.

4. The apparatus of claim 3, wherein the first object corresponds to a first object type, the importance tensor generator to calculate the first weight by:
    calculating a first number of the objects in the knowledge graph corresponding to the first object type;
    calculating an average number of the connections associated with each of the objects in the knowledge graph corresponding to the first object type; and
    calculating a standard deviation of a number of the connections associated with each of the objects corresponding to the first object type.

5. The apparatus of claim 4, wherein the importance tensor generator is to calculate the first weight by:
    normalizing the first number relative to a total number of the objects in the knowledge graph;
    normalizing the average number relative to numbers of connections associated with individual ones of the objects corresponding to the first object type; and
    normalizing the standard deviation relative to standard deviations of numbers of the connections associated with ones of the objects corresponding to other types of objects different than the first object type.

6. The apparatus of claim 3, wherein the first connection corresponds to a first connection type, the importance tensor generator to calculate the third weight by:
    calculating a number of the connections in the knowledge graph corresponding to the first connection type; and
    normalizing the number relative to a total number of the connections in the knowledge graph.

7. The apparatus of claim 1, wherein the user query is a first user query and the suggested query is a first suggested query, the importance adaptation analyzer to modify the session importance tensor based on a second user query, the user interface to provide a second suggested query to the user based on the modified session importance tensor.

8. The apparatus of claim 1, wherein the importance adaptation analyzer is to generate the session importance tensor by:
    defining the session importance tensor as corresponding to the global importance tensor;
    calculating a loss function for the session importance tensor based on ones of the objects and associated ones of the connections identified in the user query; and
    updating the session importance tensor by a negative gradient of the loss function.

9. The apparatus of claim 1, further including a query generator to:
    determine a first path in the knowledge graph, the first path defined by a first series of connections including one or more of the connections;
    calculate a first importance of the first path by multiplying the importance values associated with the connections in the first series of connections;
    determine a second path in the knowledge graph, the second path defined by a second series of connections including one or more of the connections;
    calculate a second importance of the second path by multiplying the importance values associated with the connections in the second series of connections;
    rank the first path and the second path based on the first importance and the second importance; and
    select one of the first path or the second path as a basis for the suggested query based on the ranking.

10. The apparatus of claim 1, further including a query generator to:
    identify a first object of the objects as a beginning of a path within the knowledge graph;
    define hops in the path corresponding to the connections from the first object to a second one of the objects at an ending of the path, the connections associated with one or more intermediate ones of the objects between the first and second objects along the path; and
    generate the suggested query based on the path.

11. The apparatus of claim 10, wherein the query generator is to identify subsequent ones of the one or more intermediate objects in the path based on the importance values corresponding to the connections associated with an immediately preceding object in the path.

12. The apparatus of claim 10, wherein the query generator is to:
    compare the importance values corresponding to different ones of the connections associated with the first object;
    select a first connection of the different ones of the connections associated with the first object as a first hop in the path based on the comparison; and
    identify subsequent hops in the path based on subsequent comparisons of the importance values corresponding to different ones of the connections associated with ones of the objects at an end of preceding hops in the path.

13. The apparatus of claim 10, wherein the query generator is to translate the objects and the connections along the path into a structured format corresponding to a syntax of a query language associated with the database, the suggested query provided to the user including the structured format.

14. The apparatus of claim 13, further including a query summary generator to generate a summary of the suggested query to the user that is not based on the syntax of the query language, the summary identifying the first and second objects in the path and at least one of a first one of the hops or a first one of the intermediate objects, the user interface to provide the summary to the user.

15. The apparatus of claim 1, further including an object-level summary generator to generate an object-level graph summarization of the knowledge graph, the object-level graph summarization indicative of clusters of the objects for each type of the connections, the user interface to provide the object-level graph summarization to the user.

16. The apparatus of claim 15, wherein the object-level summary generator is to:
generate a low-rank representation of the knowledge graph based on Laplacian embedding of each type of connection; and
implement a cluster analysis on the low-rank representation to identify the clusters for the object-level graph summarization.

17. The apparatus of claim 1, further including a connection-level summary generator to generate a connection-level graph summarization of the knowledge graph, the connection-level graph summarization indicative of at least one of similarities or dissimilarities between different types of the connections across the objects in the knowledge graph, the user interface to provide the connection-level graph summarization to the user.

18. The apparatus of claim 17, wherein the connection-level summary generator is to:
define connection-type-specific graphs corresponding to ones of the connections in the knowledge graph corresponding to particular types of the connections;
determine distances between different pairs of the connection-type-specific graphs based on graph matching;
identify features within a distance matrix using a sparse autoencoder, the distance matrix containing the distances between the different pairs of the connection-type-specific graphs; and
implement a cluster analysis on the identified features to identify the at least one of the similarities or the dissimilarities between the different types of the connections.

19. A non-transitory computer readable medium comprising instructions that, when executed, cause a machine to at least:
generate a global importance tensor, the global importance tensor based on a knowledge graph representative of information stored in a database, the knowledge graph including objects and connections between the objects, the global importance tensor including importance values for different types of the connections between the objects;
generate a session importance tensor based on the global importance tensor and a user query; and
provide a suggested query to a user based on the session importance tensor.

20. The non-transitory computer readable medium of claim 19, wherein the instructions further cause the machine to:
calculate a first weight for a first one of the objects;
calculate a second weight for a second one of the objects;
calculate a third weight for a first one of the connections between the first and second objects; and
calculate a first one of the importance values in the global importance tensor by multiplying the first, second, and third weights.

21. The non-transitory computer readable medium of claim 19, wherein the user query is a first user query and the suggested query is a first suggested query, the instructions to further cause the machine to:
modify the session importance tensor based on a second user query; and
provide a second suggested query to the user based on the modified session importance tensor.

22. The non-transitory computer readable medium of claim 19, wherein the instructions further cause the machine to:
identify a first object of the objects as a beginning of a path within the knowledge graph;
define hops in the path corresponding to the connections extending from the first object to a second one of the objects at an ending of the path, the connections associated with one or more intermediate ones of the objects between the first and second objects along the path; and
generate the suggested query based on the path.

23. A method comprising:
generating, by executing an instruction with at least one processor, a global importance tensor, the global importance tensor based on a knowledge graph representative of information stored in a database, the knowledge graph including objects and connections between the objects, the global importance tensor including importance values for different types of the connections between the objects;
generating, by executing an instruction with the at least one processor, a session importance tensor based on the global importance tensor and a user query; and
providing, by executing an instruction with the at least one processor, a suggested query to a user based on the session importance tensor.

24. The method of claim 23, further including:
calculating a first weight for a first one of the objects;
calculating a second weight for a second one of the objects;
calculating a third weight for a first one of the connections between the first and second objects; and
calculating a first one of the importance values in the global importance tensor by multiplying the first, second, and third weights.

25. The method of claim 23, wherein the user query is a first user query and the suggested query is a first suggested query, further including:
modifying the session importance tensor based on a second user query; and
providing a second suggested query to the user based on the modified session importance tensor.

26. The apparatus of claim 1, wherein the importance tensor generator is to generate the global importance tensor independent of user input associated with a particular query session.

27. The apparatus of claim 12, wherein the first connection associated with the first object is associated with a higher importance value than other ones of the different ones of the connections associated with the first object.

28. The apparatus of claim 27, wherein the first connection associated with the first object is associated with a lower importance value than other ones of the different ones of the connections associated with the first object.

29. The apparatus of claim 14, wherein the query summary generator is to generate, in response to a user request to expand the summary, an expanded summary of the suggested query, the expanded summary including at least one of a second one of the hops or a second one of the intermediate objects.

30. An apparatus comprising:
at least one memory;
instructions in the apparatus:
processor circuitry to execute the instructions to:
    generate a global importance tensor, the global importance tensor based on a knowledge graph representative of information stored in a database, the knowledge graph including objects and connections between the objects, the global importance tensor including importance values for different types of the connections between the objects;
    generate a session importance tensor based on the global importance tensor and a user query; and
    provide a suggested query to a user based on the session importance tensor.

31. The apparatus of claim 30, wherein the processor circuitry is to:
calculate a first weight for a first one of the objects;
calculate a second weight for a second one of the objects;
calculate a third weight for a first one of the connections between the first and second objects; and
calculate a first one of the importance values in the global importance tensor by multiplying the first, second, and third weights.

32. The apparatus of claim 30, wherein the user query is a first user query and the suggested query is a first suggested query, and the processor circuitry is to:
modify the session importance tensor based on a second user query; and
provide a second suggested query to the user based on the modified session importance tensor.

33. The apparatus of claim 30, wherein the processor circuitry is to:
identify a first object of the objects as a beginning of a path within the knowledge graph;
define hops in the path corresponding to the connections extending from the first object to a second one of the objects at an ending of the path, the connections associated with one or more intermediate ones of the objects between the first and second objects along the path; and
generate the suggested query based on the path.

* * * * *